(12) United States Patent
Parsons et al.

(10) Patent No.: US 10,775,566 B2
(45) Date of Patent: Sep. 15, 2020

(54) FIBER OPTIC LANE CHANGERS FOR USE WITH FIBER OPTIC CABLES HAVING UNUSED OPTICAL FIBERS AND RELATED METHODS

(71) Applicant: COMMSCOPE, INC. OF NORTH CAROLINA, Hickory, NC (US)

(72) Inventors: Earl R. Parsons, Allen, TX (US); Brian K. Bushnell, Wylie, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 15/770,702

(22) PCT Filed: Oct. 26, 2016

(86) PCT No.: PCT/US2016/058930
§ 371 (c)(1),
(2) Date: Apr. 24, 2018

(87) PCT Pub. No.: WO2017/075093
PCT Pub. Date: May 4, 2017

(65) Prior Publication Data
US 2019/0064448 A1 Feb. 28, 2019

Related U.S. Application Data

(60) Provisional application No. 62/246,812, filed on Oct. 27, 2015.

(51) Int. Cl.
*G02B 6/38* (2006.01)
*G02B 6/42* (2006.01)

(52) U.S. Cl.
CPC ......... *G02B 6/3825* (2013.01); *G02B 6/3885* (2013.01); *G02B 6/3893* (2013.01);
(Continued)

(58) Field of Classification Search
CPC .... G02B 6/3825; G02B 6/421; G02B 6/3893; G02B 6/4292; G02B 6/3885; G02B 6/3831
See application file for complete search history.

(56) References Cited

U.S. PATENT DOCUMENTS

| 4,662,710 A | 5/1987 | ten Berge |
| 6,614,968 B1 | 9/2003 | Eslambolchi et al. |
| (Continued) | | |

FOREIGN PATENT DOCUMENTS

| WO | 2006/113088 A2 | 10/2006 |
| WO | 2014/018428 A1 | 1/2014 |

OTHER PUBLICATIONS

International Search Report and Written Opinion of the International Searching Authority for International Patent Application No. PCT/US2016/058930 dated Dec. 20, 2016, 13 pages.
(Continued)

*Primary Examiner* — John Bedtelyton
(74) *Attorney, Agent, or Firm* — Merchant & Gould P.C.

(57) ABSTRACT

A fiber optic lane changer includes a first and a second connector. A plurality of lane changer transmission paths include first ends received within the first connector and second ends received within the second connector. The first ends are arranged in respective ones of a first subset of a plurality of optical interface positions in a standardized connector configuration, and the second ends are arranged in respective ones of a second subset of the plurality of positions. In certain embodiments, the plurality of lane changer transmission paths have first ends that are aligned to optically couple with respective ones of the eight outermost optical transmission paths of the first connector. At least one of the lane changer transmission paths may have a second end that is aligned to optically couple with one of the four
(Continued)

innermost optical transmission paths of the second connector.

28 Claims, 10 Drawing Sheets

(52) U.S. Cl.
CPC .......... *G02B 6/421* (2013.01); *G02B 6/4292* (2013.01); *G02B 6/3831* (2013.01)

(56) References Cited

U.S. PATENT DOCUMENTS

| | | | |
|---|---|---|---|
| 2003/0188432 A1 | 10/2003 | Temple | |
| 2004/0161218 A1 | 8/2004 | Sloan et al. | |
| 2006/0133736 A1* | 6/2006 | Sullivan | G02B 6/3878 385/59 |
| 2010/0303408 A1 | 12/2010 | Conner et al. | |
| 2010/0322562 A1 | 12/2010 | Barnes et al. | |
| 2013/0343700 A1* | 12/2013 | Kolesar | G02B 6/4472 385/24 |
| 2015/0183623 A1 | 7/2015 | Wacinski et al. | |

OTHER PUBLICATIONS

Extended European Search Report for Application No. 16860718.2 dated May 24, 2019.

* cited by examiner

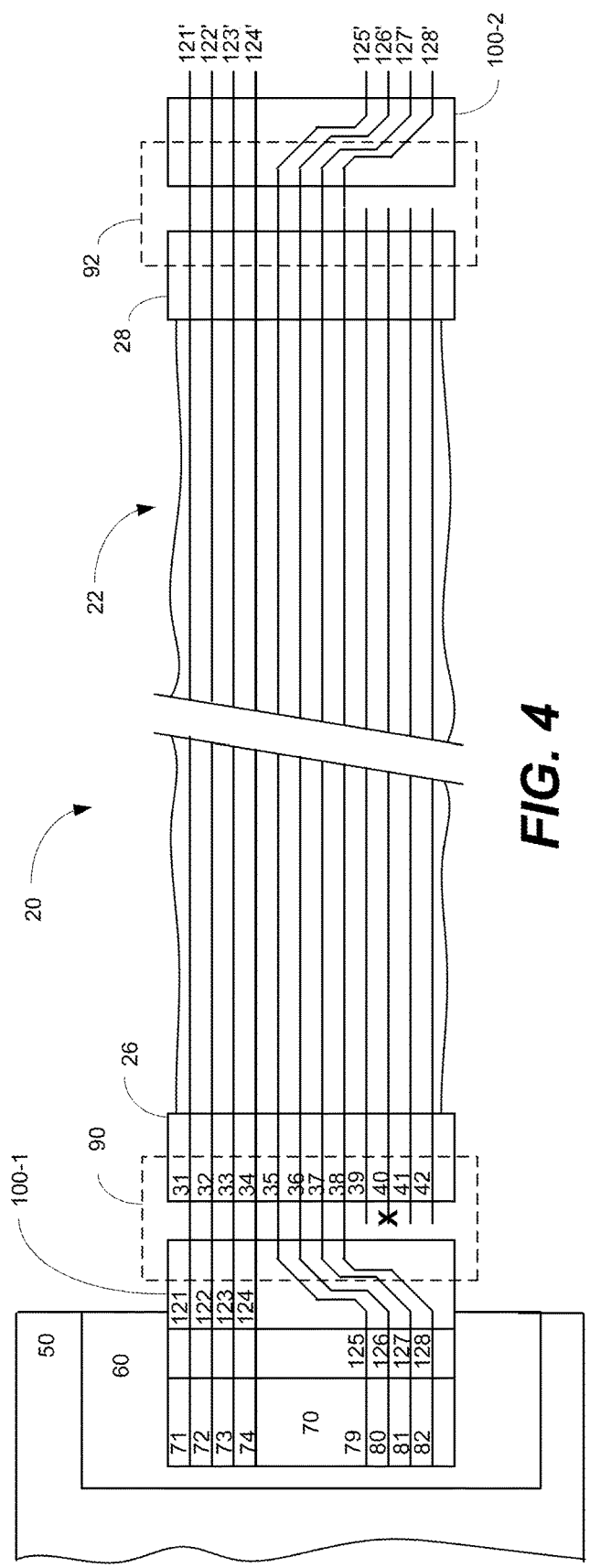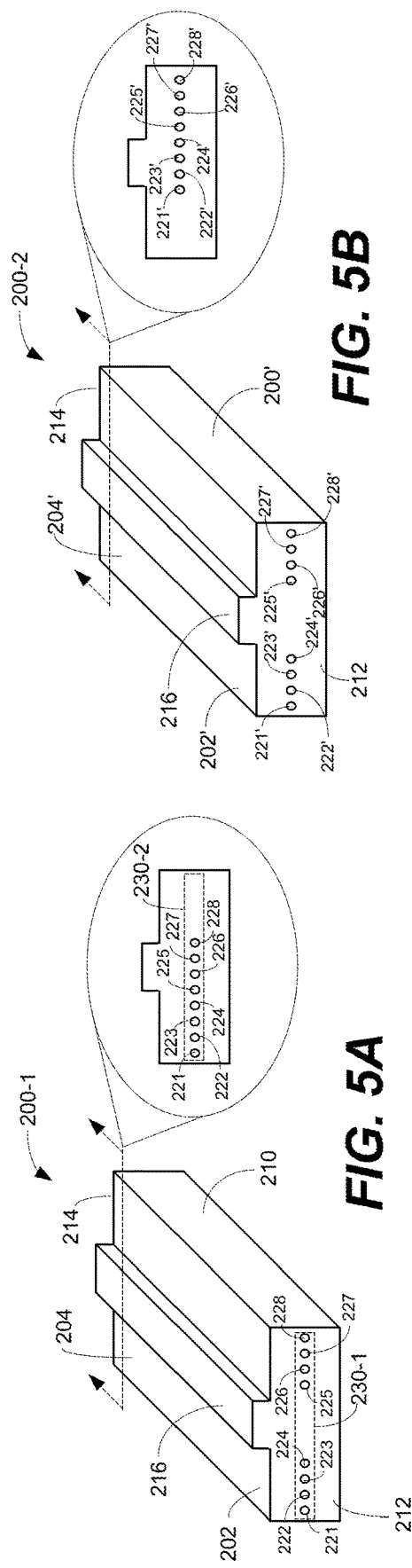
FIG. 4
FIG. 5A
FIG. 5B

FIBER OPTIC LANE CHANGERS FOR USE WITH FIBER OPTIC CABLES HAVING UNUSED OPTICAL FIBERS AND RELATED METHODS

CROSS-REFERENCE TO RELATED APPLICATION

This application is a National Stage Application of PCT/US2016/058930, filed on Oct. 26, 2016, which claims the benefit of U.S. Patent Application Ser. No. 62/246,812, filed on October 27, the disclosures of which are incorporated herein by reference in their entireties. To the extent appropriate, a claim of priority is made to each of the above disclosed applications.

FIELD OF THE INVENTION

The present invention relates generally to communications systems and, more particularly, to fiber optic communications systems.

BACKGROUND

Fiber optic communications systems are now used in a wide variety of applications because of their ability to support very high data rate communications. In fiber optic communications systems, data may be transmitted between two devices by, for example, converting radio frequency ("RF") communications signals into optical signals and then transmitting these optical signals between the two devices over one or more optical fibers. Fiber optic cables that include a relatively large number of optical fibers are now used in a wide variety of different applications. For example, fiber optic "trunk" cables that include at least twelve optical fibers are now routinely used in data centers and in other communications systems that use fiber optic communications. These cables are often terminated with Multi-fiber Push On ("MPO") connectors. As is known to those of skill in the art, an MPO connector is a small form factor connector that may be used to optically connect twelve optical fibers of a fiber optic cable to respective optical transmission paths of another fiber optic cable or of a piece of equipment such as a fiber optic transceiver. As used herein, the term "optical transmission path" refers to a path that is suitable for transmission of a fiber optic communications signal such as, for example, an optical fiber, a waveguide, a lens, etc. and combinations thereof.

While fiber optic cables may support very high data rate communications, they also have various disadvantages. For example, the optical fibers in a fiber optic cable are typically formed of glass and can be damaged if the cable is bent beyond a specified bend radius or subjected to other forces. The ends of the optical fibers that are exposed in fiber optic connectors may also be very susceptible to damage. Additionally, fiber optic cables tend to be fairly expensive, especially with respect to longer cables (e.g., 25, 50, 100 foot or longer cables). Moreover, in many applications, the fiber optic cables are routed through walls, drop ceilings and/or elevated floors in large cable bundles and hence it can be difficult to remove damaged cables and to reroute replacement cables.

BRIEF DESCRIPTION OF THE DRAWINGS

FIG. 4 is a schematic diagram that illustrates how fiber optic lane changers according to embodiments of the present invention may be used to divert optical signals from a damaged optical fiber of a fiber optic trunk cable onto a spare optical fiber of the fiber optic trunk cable when the fiber optic trunk cable of FIG. 2 is used in conjunction with the QSFP optical transceiver module of FIG. 2.

FIGS. 5A and 5B are schematic perspective views of fiber optic lane changers in the form of double-sided inline connectors according to certain embodiments of the present invention.

DETAILED DESCRIPTION

Fiber optic cables that include twelve optical fibers that are terminated with MPO connectors are widely available.

Fiber optic cables that include larger numbers of optical fibers are also routinely used such as, for example, twenty-four, forty-eight, ninety-six or more optical fibers. In fiber optic cables that include more than twelve optical fibers, one or both ends of the cable may be broken out into a plurality of smaller cables that are often referred to as "pigtails." In some cases, each pigtail may include twelve optical fibers and may be terminated with an MPO connector. The above-described fiber optic cables having twelve or more optical fibers are often referred to as fiber optic trunk cables.

Figure 1:
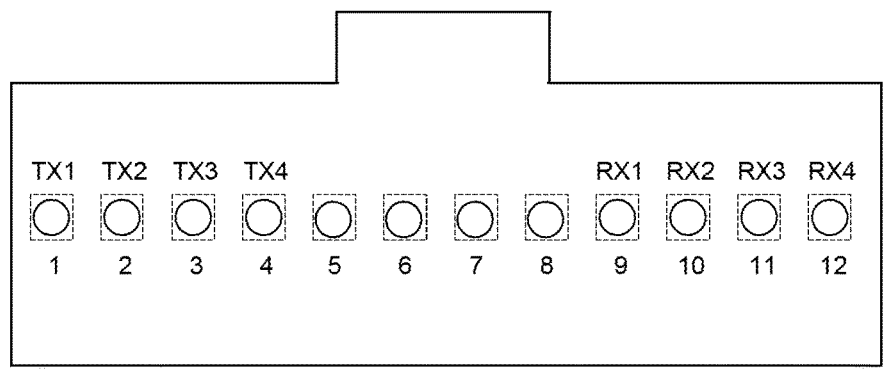
FIG. 1 is a schematic front view of a ferrule for an MPO connector that shows the twelve positions for the optical fibers of a fiber optic cable that are terminated therein and the optical fiber assignments when the cable is used with a Quad Small Form-Factor Pluggable ("QSFP") optical transceiver module.

FIG. 1 is a schematic front view of a ferrule for an MPO connector of an MPO connectorized fiber optic cable. As is known to those of skill in the art, the ferrule is a part of the fiber optic connector that holds the optical fibers and aligns the optical fibers for mating with another fiber optic connector. The ferrule is positioned within a housing of the MPO connector and the MPO connector includes other features such as protruding pins or pin holes that facilitate mating with another connector. The schematic view of FIG. 1, as well as the other attached drawings of MPO connectors, typically only illustrate the ferrule of the connector to simplify the drawings and description, as the important consideration in the present application is the relative positions of the ends of the optical fibers. Thus, it will be appreciated that the MPO connector drawings are schematic in nature.

As shown in FIG. 1, a total of twelve optical fibers may be terminated into the MPO connecter. In FIG. 1, the twelve circles aligned in a row represent the end faces of the twelve optical fibers. The square dotted boxes show the "positions" for the optical fibers, with the leftmost optical fiber being in "position 1" and the rightmost optical fiber being in "position 12" and the remaining optical fibers being disposed therebetween in positions 2 through 11. Positions 1-12 are aligned in a single row and are arranged in numerical order. Herein, the optical fibers of a fiber optic trunk cable may be referred to based on their positions in one or more of the fiber optic connectors of the fiber optic trunk cable.

While in many cases all of the optical fibers in a fiber optic trunk cable are used, there are a number of applications that do not require all twelve optical fibers. For example, Quad Small Form-Factor Pluggable ("QSFP") optical transceiver modules are in wide use today that support four 10 gigabit per second full duplex channels. QSFP optical transceiver modules typically have a connector that is designed to receive or otherwise mate with an MPO style connectorized fiber optic cable, but only use eight of the optical fibers since the transceivers have a total of four transmit channels and four receive channels. Thus, when an MPO-connectorized fiber optic cable is used with a QSFP transceiver, four of the optical fibers in the cable are not used. This is illustrated schematically in FIG. 1 by the references to the transmit ("TX") and receive ("RX") channel assignments that are used when an MPO connector is used to connect to a QSFP optical transceiver module. As shown in FIG. 1, only the optical fibers in the eight outer positions 1-4 and 9-12 of the MPO connector are used when the cable is plugged into a QSFP transceiver. The optical fibers that are terminated into positions 1-4 are the four "transmit" channels for communications between the QSFP transceiver and one or more other pieces of fiber optic equipment. The optical fibers that are terminated into positions 9-12 are the four "receive" channels that carry communications between one or more other pieces of fiber optic equipment and the QSFP transceiver. Herein, the optical fibers of a fiber optic cable that are used by the optical device(s) that are connected to the fiber optic cable are referred to as "active" optical fibers, while the unused optical fibers (if any) are referred to as "spare" optical fibers. When a trunk cable having the MPO connector of FIG. 1 is attached to a QSFP transceiver, the optical fibers in positions 1-4 and 9-12 are active optical fibers and the optical fibers in positions 5-8 of the connector are spare optical fibers.

As noted above, fiber optic cables may be susceptible to damage during installation or use. For example, during installation, the cable can be dropped, bent excessively or otherwise subjected to forces that may crack or break one or more of the optical fibers. When the connectors on the cable are connected or disconnected from other connectors, the exposed end faces of the optical fibers may be damaged. While the fiber optic cable can sometimes be re-terminated with a new, fully-polished fiber optic connector or repaired using a fusion or mechanical splice, such repairs require expensive, bulky equipment and often are not practical solutions in the field. As such, if an optical fiber of a fiber optic trunk cable is damaged in the field, the damage often renders the fiber optic trunk cable unusable.

Pursuant to embodiments of the present invention, fiber optic lane changers and methods of using these fiber optic lane changers are provided. As used herein, a "fiber optic lane changer" refers to an inline connector, cord or other structure that is interposed between a first fiber optic connector and a second fiber optic connector that would otherwise be optically connected to each other that reroutes at least one of the optical transmission paths of the first fiber optic connector so that it connects to a different optical transmission path than would be the case if the first and second fiber optic connectors were directly optically connected to each other. The optical transmission paths through a fiber optic lane changer are referred to herein as "lane changer transmission paths." Thus, the fiber optic lane changers according to embodiments of the present invention may be used to reroute an optical signal that would normally be carried on a first optical fiber of a fiber optic cable to a second optical fiber of the fiber optic cable. This is useful when, for example, one of the active optical fibers in a fiber optic cable that includes unused optical fibers is damaged, as a fiber optic lane changer may be used to reroute optical signals that would otherwise need to be transmitted over the damaged active optical fiber of the cable to a spare optical fiber instead. A second fiber optic lane changer according to embodiments of the present invention may then be connected to the far end of the cable to reroute the optical signal from the second optical fiber back to the first optical fiber. As such, the fiber optic lane changers according to embodiments of the present invention may be used to avoid the need to remove damaged fiber optic cables and replace them with new fiber optic cables.

In some embodiments, the fiber optic lane changer may be implemented as a ferrule block that has a pair of fiber optic connectors. The first of these fiber optic connectors connects the optical fibers of a first mating fiber optic connector to optical fibers (or other optical transmission paths) that are at different positions in a second mating fiber optic connector that is connected to the second of the fiber optic connectors of the fiber optic lane changer. In other embodiments, the fiber optic lane changer may be implemented as a short fiber optic patch cord that similarly connects the optical fibers of a first mating fiber optic connector to optical fibers (or other optical transmission paths) that are at different positions in a second mating fiber optic connector.

Aspects of the present invention will now be discussed in more detail with reference to FIGS. 2 through 15, in which example embodiments of the present invention are shown.

Figure 2:
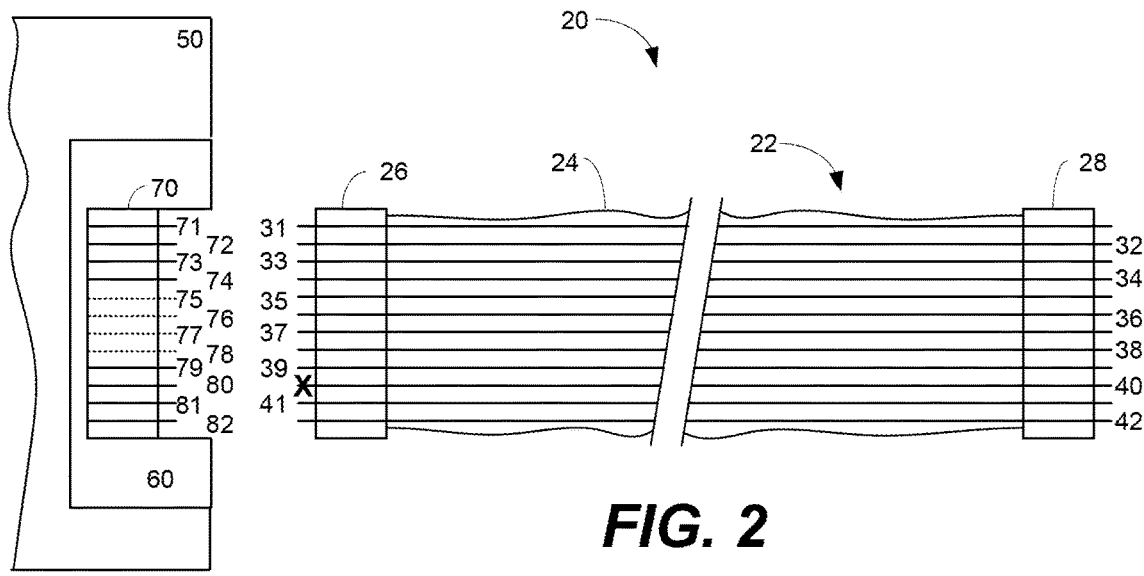
FIG. 2 is a schematic diagram that illustrates a connection between a fiber optic trunk cable and an MPO-style connection on a QSFP optical transceiver module.

FIG. 2 is a schematic diagram that illustrates a connection between a connector of a fiber optic trunk cable and an MPO-style connection on a QSFP optical transceiver module.

As shown in FIG. 2, a fiber optic trunk cable 20 may include a cable segment 22 that has a plurality of optical fibers 31-42 which are surrounded by and protected by a cable jacket 24. The cable segment 22 may include other elements such as, for example, strength members (e.g., aramid fibers), buffer tubes, etc. (not shown) that may extend for the full distance of the cable segment 22. Fiber optic connectors 26, 28 are mounted on the respective ends of the cable segment 22. First ends of the optical fibers 31-42 are terminated into the first fiber optic connector 26, and second ends of the optical fibers 31-42 are terminated into the second fiber optic connector 28. In the depicted embodiment, the first and second fiber optic connectors 26, 28 each comprise a Multi-fiber Push On ("MPO") fiber optic connector.

As is also shown in FIG. 2, the first fiber optic connector 26 of the trunk cable 20 may be connected to a QSFP optical transceiver module 50 (the QSFP optical transceiver module 50 is only partially shown in FIG. 2). The QSFP optical transceiver module 50 includes a fiber optic adapter 60 that is configured to receive an MPO connector such as the first fiber optic connector 26 of fiber optic trunk cable 20. The QSFP optical transceiver module 50 further includes an MPO interface 70 that is mounted within the fiber optic adapter 60. The MPO interface 70 includes terminations for eight optical transmission paths 71-74, 79-82 that are spaced apart from each other at the distances specified for an MPO connector. Consistent with the interface illustrated in FIG. 1, optical transmission paths 71-74 are spaced apart from optical transmission paths 79-82, and all eight optical transmission paths are aligned in a single row. As shown by the dotted lines, in some cases, four additional optical transmission paths 75-78 may be included in the MPO interface 70, although these optical transmission paths are not active (i.e., signal carrying) in a QSFP optical transceiver module 50. The optical transmission paths 71-82 may comprise, for example, optical fibers, optical waveguides or other light carrying transmission media suitable for the transmission of fiber optic communications signals.

The fiber optic adapter 60 aligns the MPO connector 26 of the fiber optic trunk cable 20 that is received therein with the MPO interface 70 so that the optical transmission paths 71-74, 79-82 of the MPO interface 70 are aligned with the respective optical fibers 31-34 and 39-42 of the fiber optic connector 26. As shown in FIG. 2, the first ends of optical fibers 31-34 that terminate into the first fiber optic connector 26 are positioned so that they will optically couple with optical transmission paths 71-74 of the MPO interface 70, respectively, and the first ends of optical fibers 39-42 that terminate into the first fiber optic connector 26 are positioned so that they will optically couple with optical transmission paths 79-82 of the MPO interface 70, respectively, when fiber optic connector 26 is inserted into the fiber optic adapter 60 of QSFP optical transceiver module 50.

As shown schematically in FIG. 2 by the "X" located on the first end of optical fiber 40, one of the optical fibers 31-42 of fiber optic trunk cable 20 may be damaged during installation, when connecting or disconnecting the connector 26, or at some other time. In FIG. 2, an end portion of optical fiber 40 is shown as having been damaged, but it will be appreciated that any portion of any of the optical fibers 31-42 may be damaged. As a result of this damage, optical signals may no longer be transmitted over optical fiber 40 of fiber optic trunk cable 20 with sufficient signal-to-noise ratio. This is generally considered to render fiber optic trunk cable 20 useless. In conventional systems, fiber optic trunk cable 20 would therefore be replaced with a new fiber optic trunk cable.

Figure 3A:
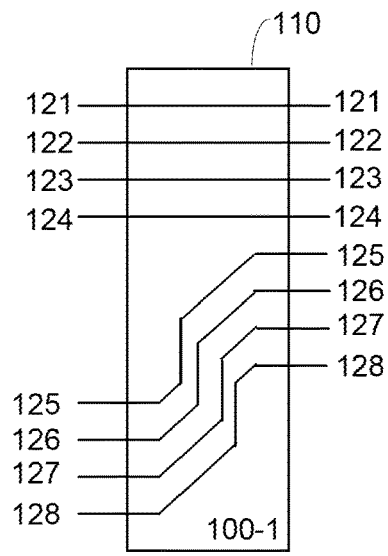
FIGS. 3A and 3B are schematic diagrams that illustrate the connection schemes implemented in two fiber optic lane changers according to embodiments of the present invention.
Figure 3B:
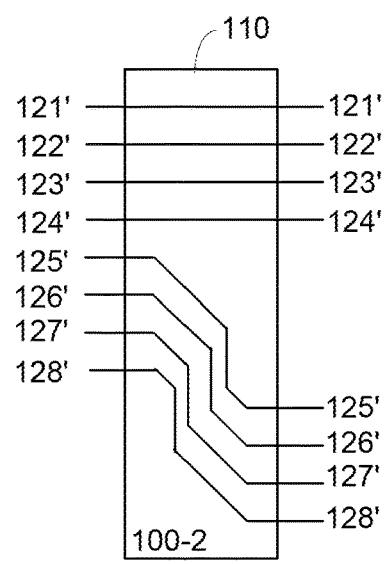

FIGS. 3A and 3B are schematic diagrams that illustrate the connection schemes implemented in two fiber optic lane changers according to embodiments of the present invention.

As shown in FIG. 3A, a fiber optic lane changer 100-1 according to embodiments of the present invention includes a plurality of "lane changer transmission paths" 121-128 that are mounted in a housing 110. Each lane changer transmission path 121-128 is an optical transmission path that is suitable for transmission of a fiber optic communications signal. In some example embodiments, each lane changer transmission path 121-128 may be a short optical fiber segment. In other example embodiments, each lane changer transmission path 121-128 may comprise one or more optical waveguides. The lane changer transmission paths 121-128 may also include other elements such as lenses, mirrors and the like.

As shown in FIG. 3A, lane changer transmission paths 121-124 may be designed as "straight-through" optical transmission paths that maintain the same connectivity on either side of the lane changer. In other words, if fiber optic lane changer 100-1 is interposed between first and second fiber optic connectors, it will not change how the optical transmission paths in the first fiber optic connector that mate with lane changer transmission paths 121-124 interconnect to respective fiber optic transmission paths in the second fiber optic connector. Since the first and second ends of fiber optic lane changer 100-1 are opposite each other, the second end of the "straight-through" lane changer transmission paths 121-124 will be in mirror image positions with respect to the first ends of the "straight-through" lane changer transmission paths 121-124 with respect to the twelve positions of the standardized MPO connector interface (see FIG. 1). For example, the first end of lane changer transmission path 121 is in position 1 of the standard MPO connector interface while the second end of lane changer transmission path 121 is in position 12.

In contrast, lane changer transmission paths 125-128 are designed to perform a "lane change" such that if fiber optic lane changer 100-1 is interposed between the above-mentioned first and second fiber optic connectors, it will act to change how the optical transmission paths in the first fiber optic connector that mate with lane changer transmission paths 125-128 interconnect to respective optical transmission paths in the second fiber optic connector. This lane change occurs because lane changer transmission paths 125-128 each include a lateral offset so that they are in respective first positions of the MPO connector on one side of the fiber optic lane changer 100-1 (namely positions 9-12 as defined above with reference to FIG. 1) but are in non-respective different mirror image positions of the MPO connector on the other side of the fiber optic lane changer 100-1 (namely, they are in positions 5-8 as defined above with reference to FIG. 1 instead of mirror image positions 1-4). Accordingly, if one or more of optical fibers 39-42 in fiber optic trunk cable 20 are damaged, fiber optic lane changer 100-1 may be interposed between MPO interface 70 and fiber optic connector 26 (see FIG. 2) so that optical transmission paths 79-82 will optically connect to optical fibers 35-38 of fiber optic trunk cable 20 instead of optical fibers 39-42.

FIG. 3B shows the lane changer transmission paths 121'-128' for a similar fiber optic lane changer 100-2 according to embodiments of the present invention. The lane change scheme in the fiber optic lane changer 100-2 of FIG. 3B is the mirror image of the lane change scheme in the fiber optic lane changer 100-1 of FIG. 3A. Circumstances where fiber optic lane changers 100-1 and 100-2 may be used are discussed in further detail below.

While FIGS. 3A and 3B illustrate fiber optic lane changers that each have eight lane changer transmission paths, it will be appreciated that it may be advantageous to include additional lane changer transmission paths in some cases, even if the additional lane changer transmission paths may be non-functional. For example, when polishing a ferrule of an MPO connector it may be necessary to have all twelve optical fibers terminated into the ferrule, or otherwise the optical fibers will not be polished properly. Thus, it will be appreciated that any of the fiber optic lane changers discussed herein may include additional optical fibers, and that those additional optical fibers may or may not have a function.

FIG. 4 is a schematic diagram that illustrates how the fiber optic lane changers 100-1, 100-2 of FIGS. 3A and 3B may be used to divert optical signals from a damaged optical fiber of a fiber optic trunk cable onto a spare optical fiber of the fiber optic trunk cable to allow the fiber optic trunk cable 20 of FIG. 2 to support the QSFP optical transceiver module 50 of FIG. 2, even though optical fiber 40 is damaged and hence unusable.

As shown in FIG. 4, pursuant to embodiments of the present invention, the first fiber optic lane changer 100-1 of FIG. 3A may be interposed between the first fiber optic connector 26 and the fiber optic adapter 60 of the QSFP optical transceiver module 50. A first fiber optic adapter 90 may be used, for example, to mate the fiber optic lane changer 100-1 to the first fiber optic connector 26 of trunk cable 20. The second fiber optic lane changer 100-2 of FIG. 3B may likewise be interposed between the second fiber optic connector 28 of fiber optic trunk cable 20 and a fiber optic cable or apparatus (not shown) that the second fiber optic connector 28 would otherwise be directly or indirectly connected to. A second fiber optic adapter 92 may be used, for example, to mate the fiber optic lane changer 100-2 to the second fiber optic connector 28 of trunk cable 20.

As is shown in FIG. 4, the lane changer transmission paths 121-124 of fiber optic lane changer 100-1 may be designed to optically couple optical fibers 31-34 of trunk cable 20 to optical transmission paths 71-74, respectively, of the MPO interface 70. Thus, lane changer transmission paths 121-124 are "straight-through" transmission paths that maintain the same connectivity that would exist if fiber optic connector 26 were directly connected to MPO interface 70. In contrast, lane changer transmission paths 125-128 are designed to optically couple optical fibers 35-38 of trunk cable 20 to optical transmission paths 79-82, respectively, of the MPO interface 70. Thus, lane changer transmission paths 125-128 reroute the optical fiber arrangement so that optical fibers 35-38 of trunk cable 20 will connect to different optical transmission paths (namely optical transmission paths 79-82) than would be the case if fiber optic connector 26 were directly connected to MPO interface 70. As can be seen in FIG. 4, in this fashion the QSFP optical transceiver module 50 will no longer transmit optical signals onto (or, alternatively, receive optical signals from) the damaged optical fiber 40 of fiber optic trunk cable 20. In particular, the fiber optic lane changer 100-1 implements a "lane change" whereby optical transmission paths 79-82 are routed to connect to optical fibers 35-38, respectively, of trunk cable 20 instead of to optical fibers 39-42, as would be the case if the fiber optic lane changer 100-1 were not interposed between fiber optic connector 26 and MPO interface 70.

Still referring to FIG. 4, it can be seen that the fiber optic lane changer 100-2 is the mirror image of fiber optic lane changer 100-1, and hence may reverse the above-described "lane change" at the far end of trunk cable 20. In this fashion, some of the optical signals that are passed between QSFP optical transceiver module 50 and another fiber optic device (not shown) over trunk cable 20 may be rerouted at the interface between the QSFP optical transceiver module 50 and the trunk cable 20 so that the optical signals will not use the damaged optical fiber 40, and the optical signals may be routed back to their original positions at the far end of trunk cable 20 in fiber optic lane changer 100-2 so that the optical signals will be in the correct positions for coupling to the fiber optic device at the far end of fiber optic trunk cable 20. Thus, by connecting a fiber optic lane changer 100 at either end of the fiber optic trunk cable 20 it is possible to reroute optical signals onto the unused optical fibers in the four center positions of the fiber optic connectors 26, 28 and then reroute these optical signals back to their original positions at the far end of the fiber optic trunk cable 20. In this manner the four "unused" optical fibers may become spare optical fibers that may be used when one or more of the active optical fibers are damaged.

FIGS. 5A and 5B are schematic perspective views of double-sided inline connector fiber optic lane changers according to certain embodiments of the present invention.

As shown in FIG. 5A, a fiber optic lane changer 200-1 is provided that is in the form of a double-sided inline MPO connector. In particular, the fiber optic lane changer 200-1 includes a first MPO connector 202 and a second MPO connector 204 that are formed in a unitary housing 210. The first MPO connector 202 is implemented in a first side 212 of the housing and the second MPO connector 204 is implemented in a second side 214 of the housing 210. The housing 210 includes a key 216 that ensures that the first MPO connector 202 and the second MPO connector 204 may only be inserted in a specific orientation into a mating fiber optic adapter or fiber optic connector such as, for example, the fiber optic adapter 60 of FIGS. 2 and 4.

The fiber optic lane changer 200-1 includes a plurality of lane changer transmission paths 221-228 that extend from the first side 212 to the second side 214 of the housing 210. The lane changer transmission paths 221-228 may comprise, for example, eight short optical fiber segments. As shown in FIG. 5A, first ends of the lane changer transmission paths 221-228 terminate into the first MPO connector 202 in a first linear array 230-1. As discussed above with reference to FIG. 1, the linear array defined by the ends of the optical fibers terminated into an MPO connector has twelve positions 1-12 where adjacent positions are spaced-apart by equal distances. The first linear array 230-1 may be viewed as having a total of twelve positions that are equally spaced apart and that may correspond to the locations of the ends of the optical transmission paths in an MPO compliant fiber optic connector. Referring to FIGS. 1 and 5A, it can be seen that in the fiber optic connector 202 the lane changer transmission paths 221-228 terminate into positions 1-4 and 9-12 in the first linear array 230-1. Consequently, the first ends of the lane changer transmission paths 221-228 are configured to mate with the optical transmission paths 71-74 and 79-82 of an MPO interface 70 on a QSFP optical transceiver module 50. No lane changer transmission paths are provided in positions 5-8 of the first linear array 230-1 in the embodiment of FIG. 5A.

As is further shown in the inset of FIG. 5A, the second ends of the lane changer transmission paths 221-228 terminate into the second fiber optic connector 204. Note that the inset in FIG. 5A illustrates the positions of the second ends of the lane changer transmission paths 221-228 when looking at a cross-section of the second fiber optic connector 204 from the position of the first fiber optic connector 202. As shown in the inset, the lane changer transmission paths 221-228 terminate into the second MPO connector 204 in a second linear array 230-2. The second linear array 230-2 may also be viewed as having a total of twelve positions that are equally spaced apart and that may correspond to the locations of the ends of the optical transmission paths in an MPO compliant fiber optic connector. However, in fiber optic connector 204 the lane changer transmission paths 221-228 are in positions 5-12 of the second linear array 230-2. In this fashion, optical signals that are coupled onto the respective lane changer transmission paths 225-228 which are in positions 9-12 in the first linear array 230-1 in fiber optic connector 202 are transitioned to positions 5-8 in the second linear array 230-2 in fiber optic connector 204. If fiber optic connector 202 is mated with the MPO interface 70 on a QSFP optical transceiver module 50 and fiber optic connector 204 is mated with a fiber optic connector 26 of an MPO connectorized fiber optic trunk cable 20, then the optical signals transmitted (or received) on optical transmission paths 79-82 of the MPO interface 70 may be coupled onto the optical fibers 35-38, respectively, of the fiber optic trunk cable 5 instead of optical fibers 39-42, respectively, as a result of the "lane change" that occurs in fiber optic lane changer 200-1. This can be seen in FIG. 4 as fiber optic lane changer 100-1 of FIG. 4 has the same lane changing design as fiber optic lane changer 200-1 of FIG. 5A. Thus, if one or more of the optical fibers 39-42 on the fiber optic trunk cable 20 are damaged, then fiber optic lane changer 200-1 may be used to route the optical signals that are transmitted to the QSFP optical transceiver module 50 over optical fibers 35-38 of the fiber optic trunk cable (instead of optical fibers 39-42) while still passing these optical signals to the QSFP transceiver 50.

As noted above, in the embodiment of FIG. 5A, the housing 210 of fiber optic lane changer 200-1 includes a key 216. The fiber optic adapter 90 will likewise include a mating key structure which ensures that the first fiber optic connector 202 may only be inserted into the adapter 90 in one orientation (i.e., the key 216 prevents the first fiber optic connector 202 from being turned upside down and then inserted into the adapter 90). Thus, the key 216 ensures that the positions of the lane changer optical transmission paths 221-228 are known.

Figure 6A:
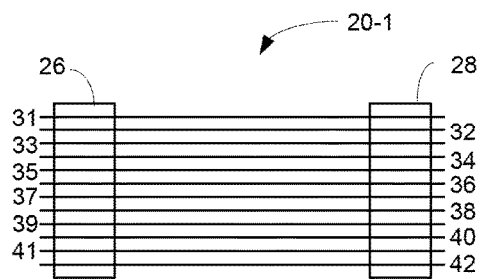
FIGS. 6A and 6B are schematic diagrams illustrating two common optical fiber connectivity architectures used in fiber optic trunk cables.

As noted above, in most applications, a fiber optic lane changer will need to be connected at either end of the fiber optic trunk cable 20 having the damaged optical fibers. Typically, the fiber optic trunk cable 20 will have one of two different designs. In the first of these designs, the optical fibers 31-42 of the fiber optic trunk cable 20 may be viewed as passing straight through the cable without crossing over each other. Such a fiber optic trunk cable 20-1 is shown schematically in FIG. 6A. As shown in FIG. 6A, the optical fibers 31-42 terminate into mirror image positions in the connectors on either end of the fiber optic trunk cable 20-1. In the second of these designs, the optical fibers of the fiber optic trunk cable 20 may be viewed as crossing over each other to be in the same image positions in the two connectors. A fiber optic trunk cable 20-2 having this design is shown in FIG. 6B.

Referring again to FIGS. 4 and 5A, the fiber optic apparatus (not shown) that is connected (directly or indirectly) at the far end of the fiber optic trunk cable 20 will be designed to transmit and receive signals on the outermost eight optical fibers 31-34 and 39-42 of fiber optic connector 28 of fiber optic trunk cable 20. Thus, it is necessary to transition the signals that are carried on the four innermost of the optical fibers 35-38 of fiber optic trunk cable 20 back to the appropriate ones of the outer optical fibers 31-34 and 39-42. A second fiber optic lane changer according to embodiments of the present invention may be used to accomplish this. The fiber optic connector of the lane changer that connects to the fiber optic apparatus that is connected at the far end of the trunk cable 20 will have a first fiber optic connector that has the lane changer transmission paths terminated into the connector in the arrangement shown in fiber optic connector 202 of lane changer 200-1 of FIG. 5A, as such an arrangement may be necessary to ensure that the proper connectivity is maintained to the fiber optic apparatus. The configuration of the termination of the lane changer transmission paths into the fiber optic connector on the other end of the second lane changer may vary based on the configuration of the trunk cable.

Figure 6B:
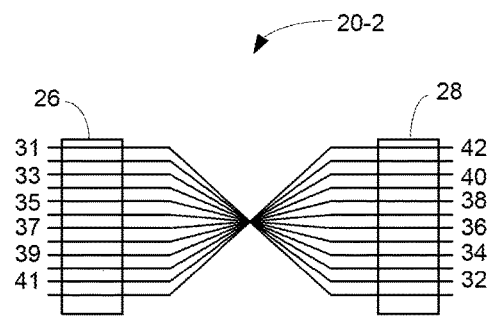

In particular, if the fiber optic trunk cable 20 has the design of the fiber optic trunk cable 20-2 of FIG. 6B, the same fiber optic lane changer 200 that is shown in FIG. 5A may be attached to the second connector 28 of trunk cable 20 to reroute the optical signals carried on optical fibers 31-38 back to their appropriate positions. If the fiber optic trunk cable 20 instead has the design of the fiber optic trunk cable 20-1 of FIG. 6A, then a different fiber optic lane changer design may be necessary. Specifically, referring to FIG. 5B, a fiber optic lane changer 200-2 is provided that again is in the form of a double-sided inline MPO connector. The fiber optic lane changer 200-2 may be almost identical to the fiber optic lane changer 200-1, except that in the fiber optic lane changer 200-2 a second MPO connector 204' is used in which lane changer transmission paths 221'-224' are in positions 1-4 in fiber optic connector 202' and are in positions 5-8 in fiber optic connector 204'. This change ensures that the end-to-end optical transmission paths are maintained in their proper positions despite the rerouting of four of the outside optical transmission paths to the four innermost optical transmission paths of the MPO connectors 26, 28 on the fiber optic trunk cable 20.

Thus, it will be appreciated that, depending upon the design of the fiber optic trunk cable 20, either a pair of the fiber optic lane changers 200-1 or one fiber optic lane changer 200-1 and one fiber optic lane changer 200-2 may be used to reroute four of the optical transmission paths 79-82 on the MPO interface 70 of a first piece of fiber optic equipment such as, for example, a QSFP optical transceiver module 50 onto the four innermost optical fibers 35-38 of the fiber optic trunk cable 20 and then rerouting the optical transmission paths at the far end of the fiber optic trunk cable 20 back to their original configuration so that the optical signals can be delivered to a second piece of fiber optic equipment.

In the description above, it was assumed that the optical fiber in position 10 of the first MPO connector 26 of an MPO connectorized fiber optic trunk cable 20 was damaged (i.e., optical fiber 40). As discussed, the fiber optic lane changer 200-1 (which has the same configuration as fiber optic lane changer 100-1 of FIG. 3A) may be used to reroute the optical signals carried on positions 9-12 of the MPO interface 70 of the QSFP optical transceiver module 50 to the optical fibers 35-38 in positions 5-8 of the first connector 26 on the MPO connectorized trunk cable 20. Thus, if one or more of the optical fibers 39-42 in positions 9-12 of the first connector 26 on the MPO connectorized fiber optic trunk cable 20 are damaged, the fiber optic lane changers 200-1, 200-2 may be used to reroute the optical signals from positions 9-12 of the MPO interface 70 on the QSFP optical transceiver module 50 onto the (undamaged) optical fibers 35-38 in positions 5-8 of the first connector 26 on the MPO connectorized trunk cable 20. It will be appreciated that if the damaged optical fiber(s) on the fiber optic trunk cable 20 are one or more of optical fibers 31-34 instead in positions 1-4 of the first connector 26 on the MPO connectorized trunk cable 20, then fiber optic lane changer 200-2 could be mated with the first connector 26 on the MPO connectorized trunk cable 20 to reroute the optical signals from positions 1-4 of the MPO interface 70 on the QSFP optical transceiver module 50 onto the (undamaged) optical fibers 35-38 in positions 5-8 of the first connector 26 on the MPO connectorized trunk cable 20. Thus, the combination of fiber optic lane changers 200-1 and 200-2 may be used to address damage to (1) one or more of the optical fibers that are terminated into positions of 1-4 of the first connector on the MPO connectorized trunk cable or (2) one or more of the optical fibers that are terminated into positions of 9-12 of the first connector on the MPO connectorized trunk cable.

Figure 7A:
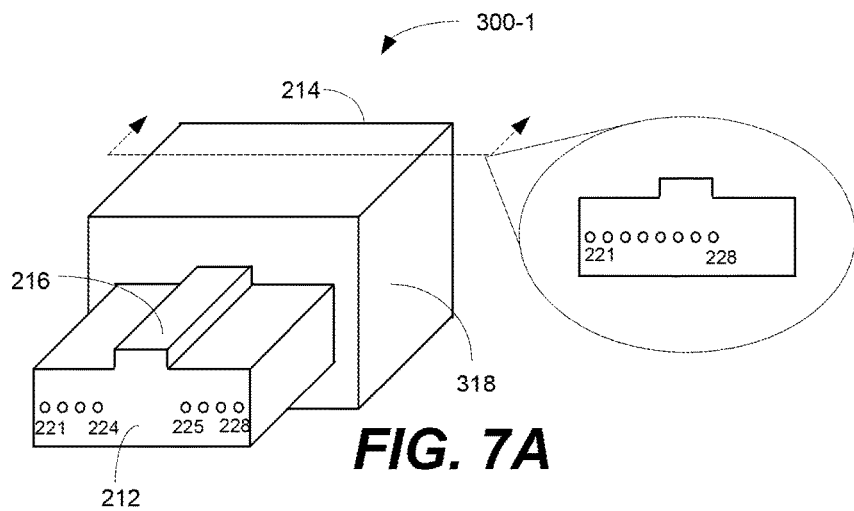
FIGS. 7A and 7B are schematic perspective views of fiber optic lane changers in the form of inline connector-adapters according to further embodiments of the present invention.
Figure 7B:
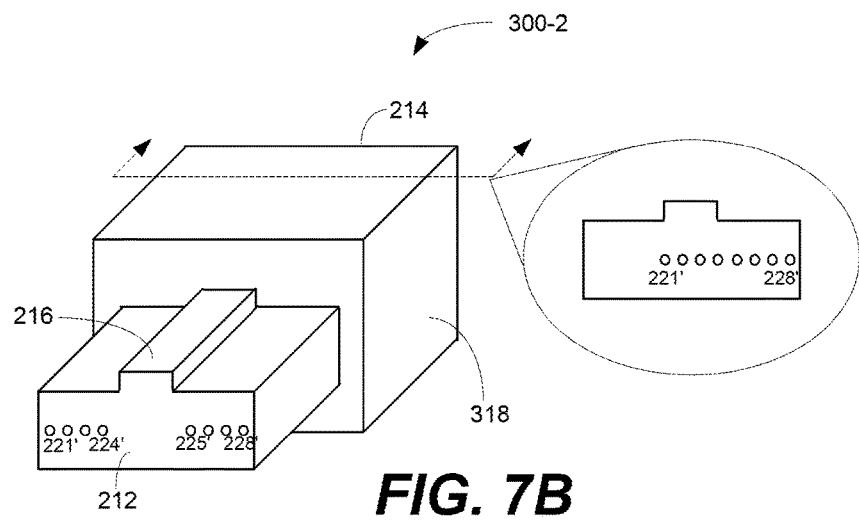

FIGS. 5A and 5B illustrate example fiber optic lane changer designs which are in the form of double-sided inline MPO connectors. It will be appreciated, however, that a wide variety of other configurations are possible. For example, FIGS. 7A and 7B are schematic perspective views of fiber optic lane changers 300-1, 300-2 according to further embodiments of the present invention, each of which is in the form of a double-sided inline MPO connector with an integrated adapter on one side thereof. This design allows the elimination of the fiber optic adapters 90, 92 that are shown in FIG. 4 as the fiber optic adapters are integrated into the respective fiber optic lane changers 300-1, 300-2.

As can be seen in FIG. 7A, the front side of fiber optic lane changer 300-1 may be identical to the front side of fiber optic lane changer 200-1 of FIG. 5A. While not visible in FIG. 7A, the back side of fiber optic lane changer 300 may also be identical to the back side of fiber optic lane changer 200-1 of FIG. 5A. Accordingly, these portions of fiber optic lane changer 300-1 are labeled using the same reference numerals as the corresponding portions of fiber optic lane changer 200-1 and will not be discussed further herein. Additionally, fiber optic lane changer 300-1 further includes an adapter housing 318 that extends over the fiber optic connector 204. The adapter housing 318 may be sized to receive an MPO connector such as an MPO connector 26, 28 of an MPO connectorized fiber optic trunk cable 20. The adapter housing 318 may be designed to align the MPO connector 26, 28 of such an MPO connectorized fiber optic trunk cable 20 with the MPO fiber optic connector 204 of fiber optic lane changer 300-1. Thus, fiber optic lane changer 300-1 may work in the exact same fashion as fiber optic lane changer 200-1 of FIG. 5A, except that fiber optic lane changer 300-1 eliminates any need for a separate fiber optic adapter for connecting fiber optic lane changer 300-1 to the connector 26, 28 of the fiber optic trunk cable 20. Fiber optic lane changer 300-2 of FIG. 7B may likewise be identical to fiber optic lane changer 200-2 of FIG. 5B except that fiber optic lane changer 300-2 further includes an adapter housing 318.

Figure 8A:
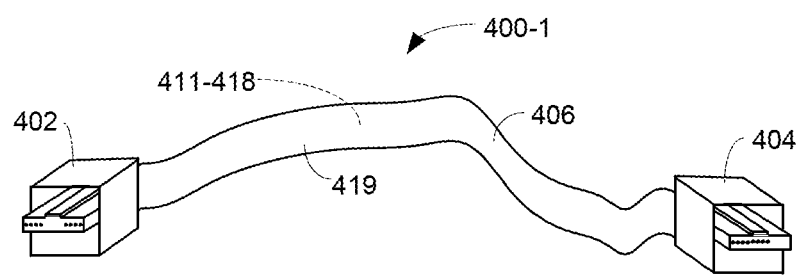
FIGS. 8A and 8B are schematic perspective views of fiber optic lane changers in the form of lane-changing patch cords according to still further embodiments of the present invention.
Figure 8B:
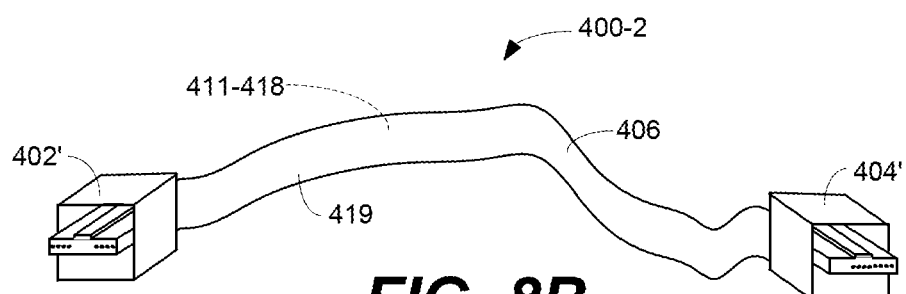

FIGS. 8A and 8B are schematic perspective views of fiber optic lane changers according to still further embodiments of the present invention in the form of lane-changing patch cords 400-1, 400-2. The fiber optic lane changing patch cords 400-1, 400-2 may be used in place of the fiber optic lane changers 200-1, 200-2 that are discussed above.

As shown in FIG. 8A, fiber optic lane changer 400-1 includes a first fiber optic connector 402, a second fiber optic connector 404 and a cable segment 406 that extends therebetween. The cable segment 406 may include, for example, eight optical fibers 411-418, which may be enclosed in a jacket 419. The cable segment 406 may include other elements such as strength fibers or other strength members, buffer tubes, etc. The first and second fiber optic connectors 402, 404 may be similar to the fiber optic connectors 202, 204, respectively, that are described above with respect to FIG. 5A, except that instead of short optical fiber segments (or other types of optical transmission paths) extending from the first connector to the second connector as is the case with connectors 202, 204, the optical fibers 411-418 of the cable segment 406 extend between and are terminated into the first and second connectors 402, 404. Fiber optic patch cord 400-2 may likewise be a patch cord equivalent of the fiber optic lane changer 200-2 of FIG. 5B. Operation of the fiber optic lane changing patch cords 400-1 and 400-2 may be identical to the operation of the fiber optic lane changers 200-1 and 200-2 that are described above, and hence further description of the operation of the fiber optic lane changing patch cords 400-1 and 400-2 will be omitted.

Figure 9:
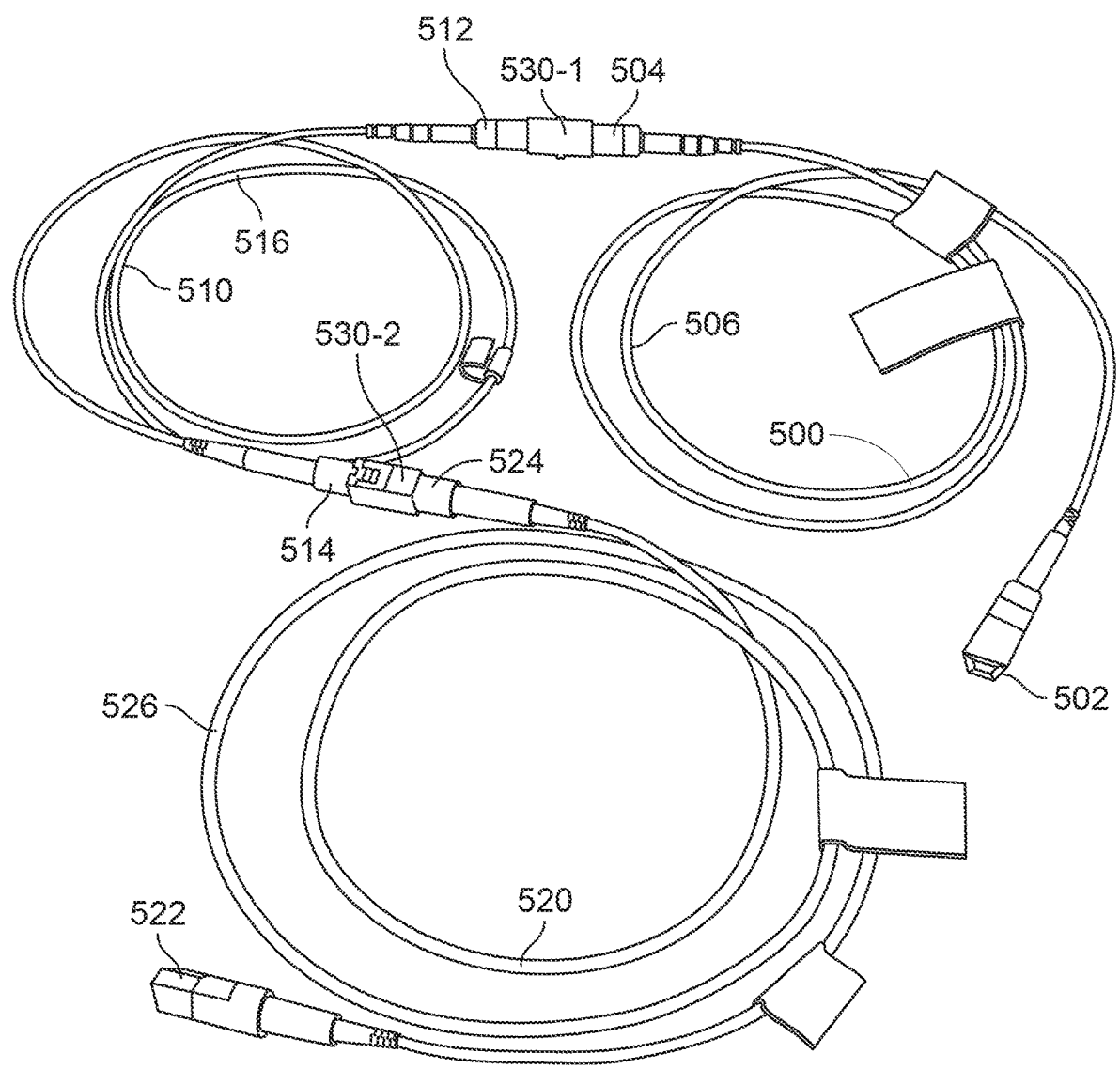
FIG. 9 is a perspective view illustrating how the fiber optic lane changer patch cords of FIGS. 8A and 8B may be connected to a damaged fiber optic trunk cable.

FIG. 9 is a perspective view of a pair of fiber optic lane changer patch cords 500, 520 being used to route optical signals onto spare optical fibers of a damaged fiber optic trunk cable 510. In particular, as shown in FIG. 9, a first fiber optic lane changer patch cord 500 has a first fiber optic connector 502, a second fiber optic connector 504 and a cable segment 506. The fiber optic patch cord 500 may have, for example, the design of the fiber optic patch cord 400-1 of FIG. 8A. A fiber optic trunk cable 510 is also provided. The fiber optic trunk cable 510 may comprise, for example, an MPO connectorized fiber optic trunk cable that has MPO connectors 512, 514 on the respective ends thereof, as well as a cable segment 516 that includes twelve optical fibers that are within a jacket. A second fiber optic lane changer patch cord 520 has a first fiber optic connector 522, a second fiber optic connector 524 and a cable segment 526. If the fiber optic trunk cable 510 has the design of the fiber optic trunk cable 20-1 of FIG. 6A, then the fiber optic patch cord 520 may have the design of the fiber optic patch cord 400-2 of FIG. 8B. If the fiber optic trunk cable 510 instead has the design of the fiber optic trunk cable 20-2 of FIG. 6A, then the fiber optic patch cord 520 may have the design of the fiber optic patch cord 400-1 of FIG. 8A.

As is further shown in FIG. 9, first and second fiber optic adapters 530-1, 530-2 are provided. Fiber optic adapter 530-1 is used to connect fiber optic connector 504 of fiber optic lane changer patch cord 500 to fiber optic connector 512 of fiber optic trunk cable 510. Fiber optic adapter 530-2 is used to connect fiber optic connector 524 of fiber optic lane changer patch cord 520 to fiber optic connector 514 of fiber optic trunk cable 510. Fiber optic connector 502 of fiber optic lane changer patch cord 500 may be plugged into, for example, a fiber optic adapter 60 of a first piece of fiber optic equipment such as, for example, a QSFP optical transceiver module 50 (not shown). Fiber optic connector 522 of fiber optic lane changer patch cord 520 may be plugged into, for example, a fiber optic adapter 60 of a second piece of fiber optic equipment (not shown).

Figure 10A:
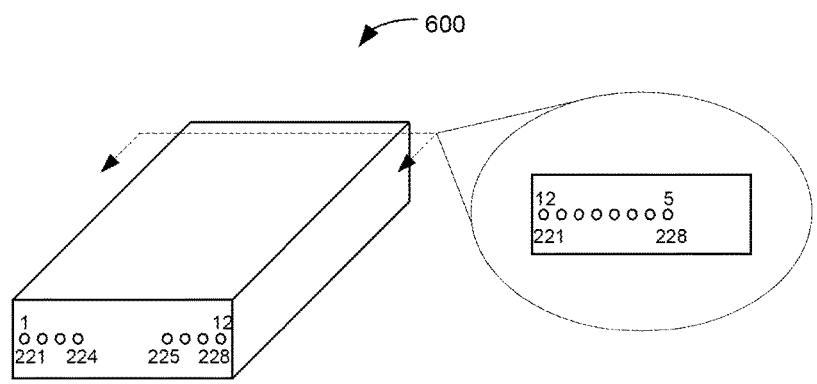
FIGS. 10A and 10B are schematic perspective views of an un-keyed fiber optic lane changer according to embodiments of the present invention that may be used in place of the fiber optic lane changers of FIGS. 5A and 5B.
Figure 10B:
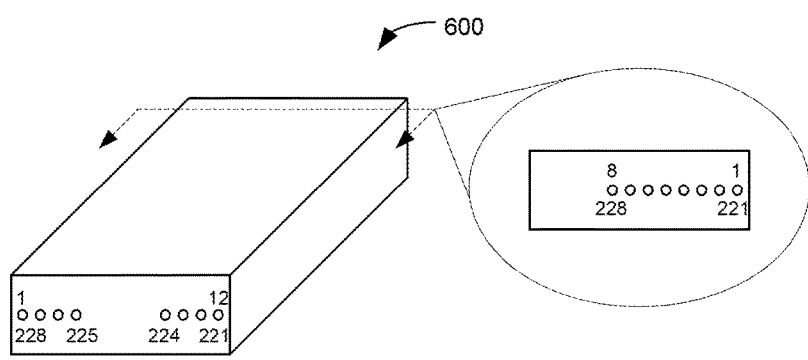

FIGS. 10A and 10B are schematic perspective views of an un-keyed fiber optic lane changer 600 in two different orientations that may be used instead of the fiber optic lane changers 200-1, 200-2 of FIGS. 5A-5B.

Referring first to FIG. 10A, an un-keyed fiber optic lane changer 600 is illustrated which is very similar to the fiber optic lane changer 200-1 of FIG. 5A. The primary difference between the fiber optic lane changer 600 and the fiber optic lane changer 200 is that the fiber optic lane changer 600 does not include the key 216 on the housing 210 that is provided on fiber optic lane changer 200-1. As a result, the fiber optic lane changer 600 may be inserted into a fiber optic adapter in a first orientation, which is the orientation shown in FIG. 10A or, alternatively, may be inserted into the fiber optic adapter in a second "upside down" orientation, which is the orientation shown in FIG. 10B. In this second orientation, the fiber optic lane changer 600 is rotated 180 degrees around its longitudinal axis from the first orientation.

As shown in FIG. 10A, in the first orientation, lane changer transmission paths 221-224 (positions 1-4) act as pass-through lane changer transmission paths that route to mirror image positions 12-9, and lane changer transmission paths 225-228 (positions 9-12) are rerouted to positions 8-5, which are non-mirror image positions, and hence which act to reroute optical signals that are input onto these lane changer transmission paths. As shown in FIG. 10B, if fiber optic lane changer 600 is turned over so that it is in the second orientation, then lane changer transmission paths 225-228 (positions 4-1) are rerouted to positions 5-8, and lane changer transmission paths 221-224 (positions 12-9) are pass-through lane changer transmission paths that route to mirror image positions 1-4. Thus, the fiber optic lane changer 600 may be used to re-route optical fibers in either (1) positions 1-4 or (2) positions 9-12 of the first fiber optic connector on an MPO connectorized fiber optic trunk cable to positions 5-8 of first fiber optic connector on an MPO connectorized fiber optic trunk cable. Accordingly, with fiber optic lane changer 600, the same fiber optic lane changer may be used on either end of the fiber optic trunk cable regardless of whether the fiber optic trunk cable has the design of FIG. 6A or FIG. 6B, and the same fiber optic lane changer 600 may be used on trunk cables having damage to optical fibers that are terminated into both positions 1-4 and positions 9-12 of the first MPO connector.

Figure 11A:
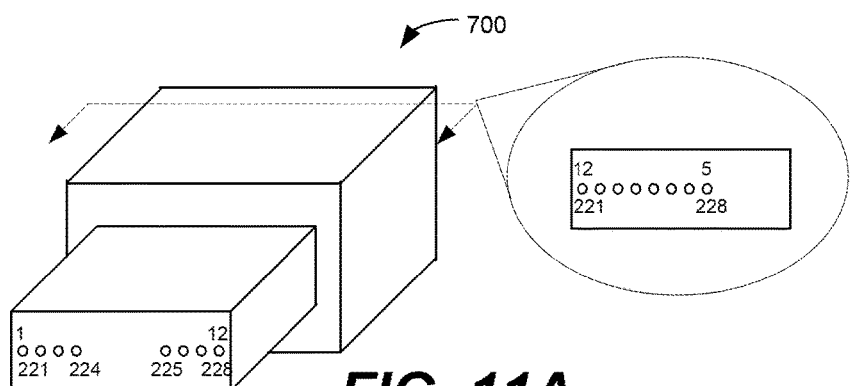
FIGS. 11A and 11B are schematic perspective views of another un-keyed fiber optic lane changer according to embodiments of the present invention that may be used in place of the fiber optic lane changers of FIGS. 7A and 7B.
Figure 11B:
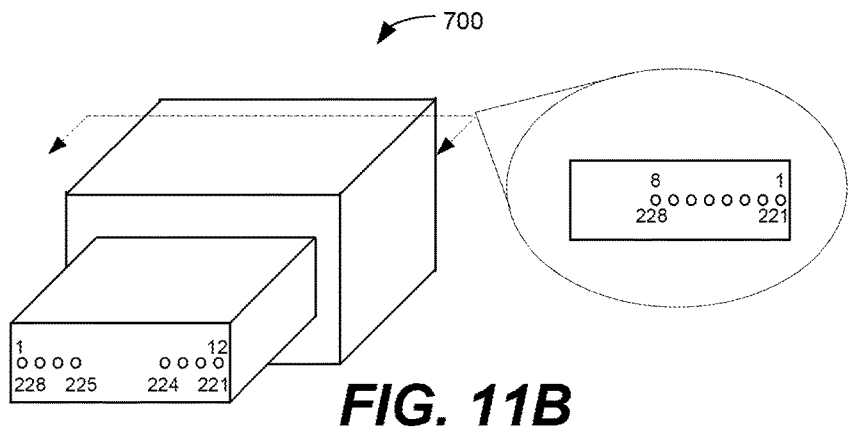

FIGS. 11A and 11B are schematic perspective views of an un-keyed fiber optic lane changer 700 in two different orientations that may be used instead of the fiber optic lane changers 300-1, 300-2 of FIGS. 7A-7B, respectively. As is readily apparent, fiber optic lane changer 700 is simply an un-keyed version of fiber optic lane changer 300-1. Accordingly, it will be appreciated that fiber optic lane changer 700 may be used instead of the fiber optic lane changers 300-1, 300-2 of FIGS. 7A-7B in the exact same way that fiber optic lane changer 600 may be used instead of the fiber optic lane changers 200-1, 200-2 of FIGS. 5A-5B, as is described above. Accordingly, further description of the fiber optic lane changer 700 will be omitted.

FIGS. 12A through 12K are schematic diagrams illustrating additional alternative lane changing schemes for fiber optic lane changers according to further embodiments of the present invention.

Figure 12A:
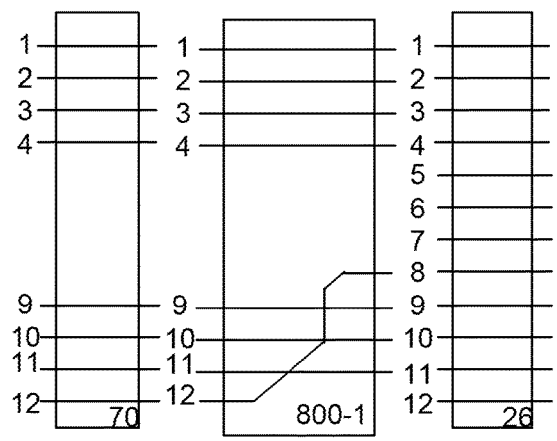
FIGS. 12A through 12J are schematic diagrams illustrating additional alternative lane changing schemes for fiber optic lane changers according to embodiments of the present invention that reduce the complexity of the fiber optic lane changers.
Figure 12B:
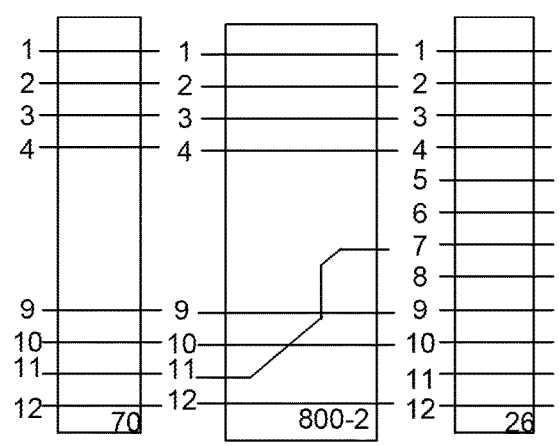
Figure 12C:
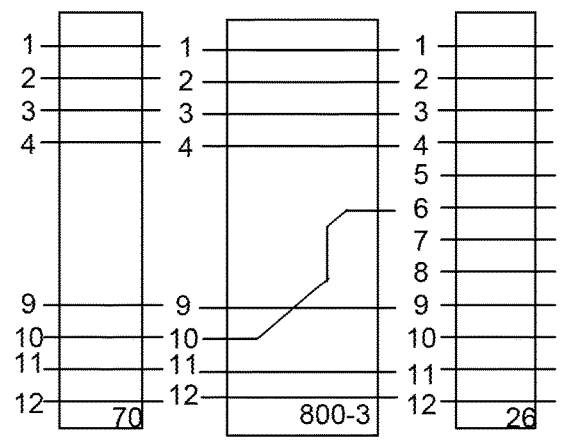
Figure 12D:
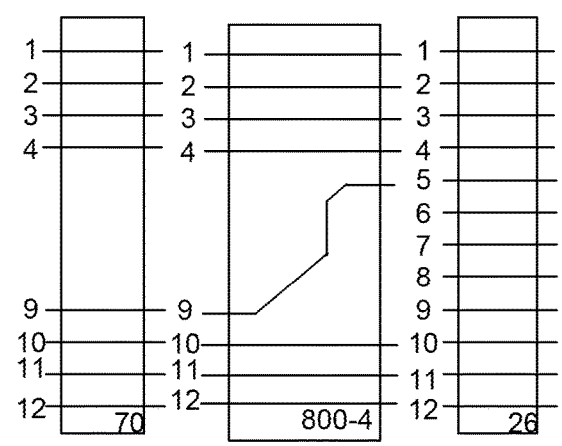
Figure 12E:
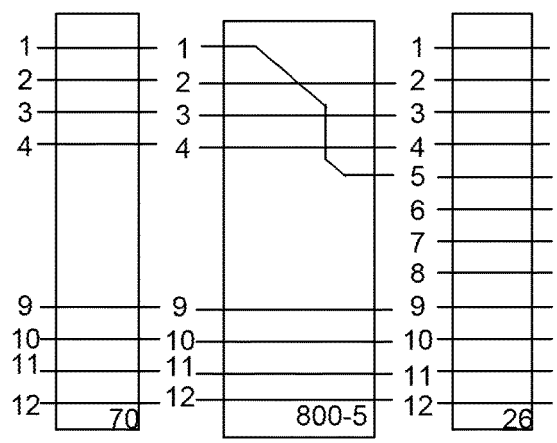
Figure 12F:
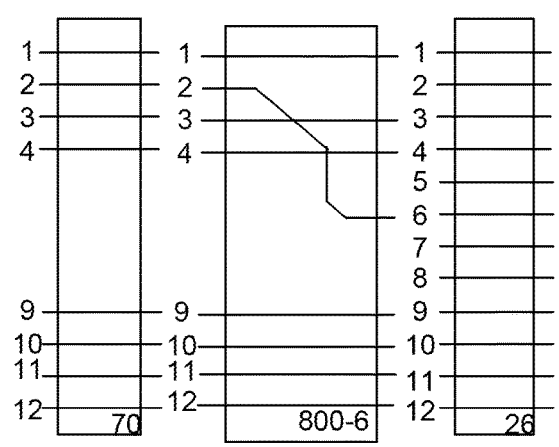
Figure 12G:
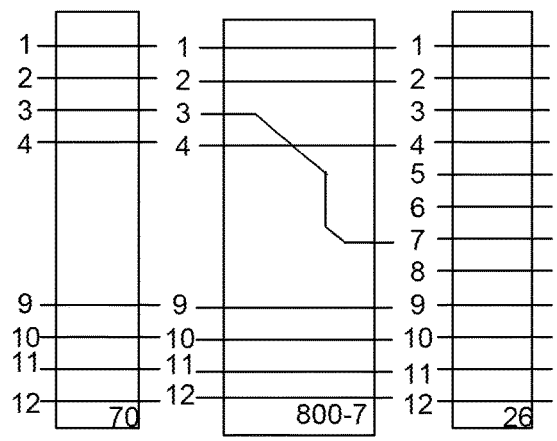
Figure 12H:
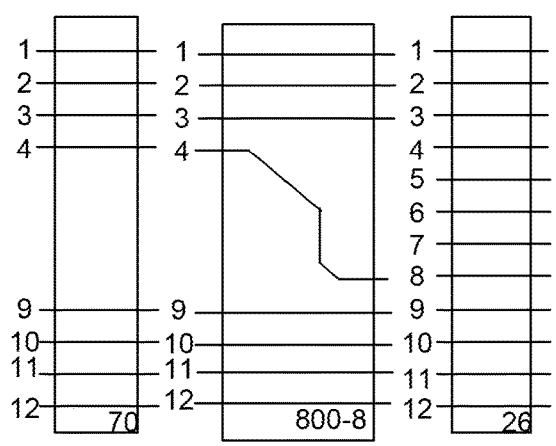

The fiber optic lane changers that are described above reroute four optical transmission paths of a first fiber optic connector that is connected to a fiber optic trunk cable so that the four optical transmission paths will connect to spare optical fibers of the fiber optic trunk cable. It will be appreciated, however, that different numbers of optical transmission paths may be rerouted in this fashion in other embodiments of the present invention. Examples of fiber optic lane changers 800-1 through 800-10 that reroute different numbers of optical transmission paths onto spare optical fibers of a fiber optic trunk cable are shown in FIGS. 12A-12K. In FIGS. 12A-12K, it is assumed the left side of each fiber optic lane changer is connected to a connector on a piece of fiber optic equipment and that the right side of the fiber optic lane changer is connected with a connector of a fiber optic trunk cable. FIG. 12A schematically depicts a fiber optic lane changer 800-1 that reroutes optical transmission path 12 of a fiber optic connector 70 on a piece of fiber optic equipment—which would normally optically couple with an optical fiber that is terminated into position 12 of a mating fiber optic connector 26 of a fiber optic trunk cable—onto an optical fiber that is terminated into position 8 of the fiber optic connector 26 on the fiber optic trunk cable (only fiber optic connector 26 of the fiber optic trunk cable is shown). FIG. 12B illustrates a fiber optic lane changer 800-2 that reroutes optical transmission path 11 of fiber optic connector 70 so that it will optically couple with an optical fiber that is terminated into position 7 of the mating fiber optic connector 26 instead of the optical fiber terminated into position 11 of fiber optic connector 26. FIG. 12C illustrates a fiber optic lane changer 800-3 that reroutes optical transmission path 10 of fiber optic connector 70 so that it will optically couple with an optical fiber that is terminated into position 6 of the mating fiber optic connector 26 instead of the optical fiber terminated into position 10 of fiber optic connector 26. FIG. 12D illustrates a fiber optic lane changer 800-4 that reroutes optical transmission path 9 of fiber optic connector 70 so that it will optically couple with an optical fiber that is terminated into position 5 of the mating fiber optic connector 26 instead of the optical fiber terminated into position 9 of fiber optic connector 26. Thus, a cascade of the four fiber optic lane changers 800-1 through 800-4 may be used to accomplish the same lane changes as the fiber optic lane changer 100-1 of FIG. 3A (although with greater connection losses). Furthermore, cascading two or more of the various fiber optic lane changers, described and/or suggested herein, may selectively reroute one or more optical transmission path(s), as desired. Cascading two or more of the various fiber optic lane changers may establish multiple rerouted optical transmission path(s) with a limited set of fiber optic lane changer types. A cascaded stack of fiber optic lane changers may include fiber optic lane changers with one, two, or more rerouted optical transmission path(s).

Similarly, fiber optic lane changers 800-5 through 800-8 which are schematically illustrated in FIGS. 12E through 12H reroute optical transmission paths 1 through 4, respectively, of fiber optic connector 70 so that they will optically couple with optical fibers that are terminated into positions 5-8, respectively, of the mating fiber optic connector 26 instead of the optical fibers that are terminated into positions 1-4, respectively, of fiber optic connector 26.

Figure 12I:
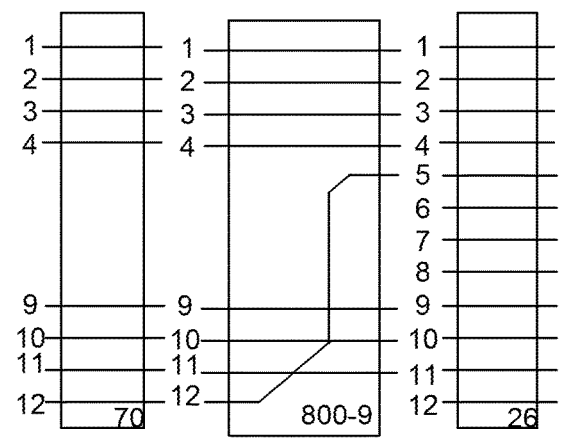

It will likewise be appreciated that any of the optical transmission paths of the fiber optic connector 70 may be rerouted to any of the spare optical fibers of the fiber optic trunk cable 20, and not just to the specific spare optical fibers illustrated in the example embodiments of FIGS. 12A-12H. For example, while the fiber optic lane changer 800-1 of FIG. 12A reroutes optical transmission path 12 of the fiber optic connector 70 onto an optical fiber that is terminated into position 8 of the fiber optic connector 26, FIG. 12I shows an alternative fiber optic lane changer 800-9 that reroutes optical transmission path 12 instead onto an optical fiber that is terminated into position 5 of the fiber optic connector 26. In other embodiments (not shown), optical transmission path 12 could instead be rerouted onto the optical fibers that are terminated into positions 6 or 7 of the fiber optic connector 26. Optical transmission paths 1-4 and 9-11 of the fiber optic connector 70 could likewise be rerouted onto any of the spare optical fibers of the fiber optic trunk cable in other example embodiments (not shown).

Figure 12J:
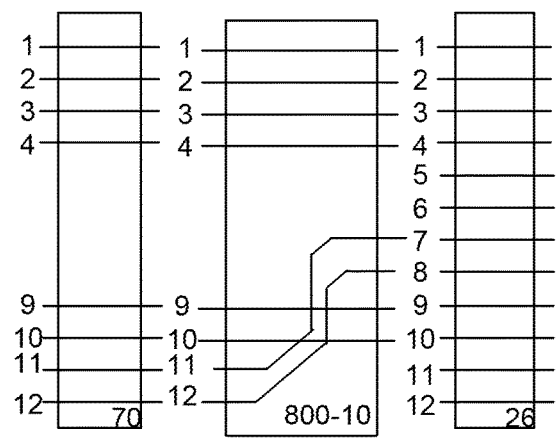
Figure 12K:
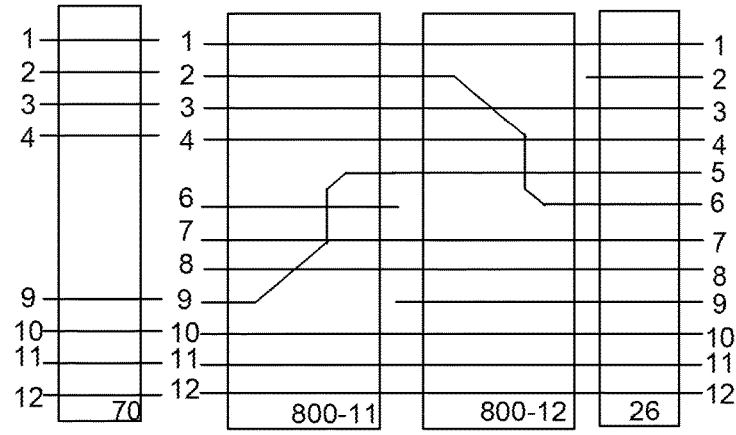
FIG. 12K is a schematic diagram illustrating how two fiber optic lane changers according to embodiments of the present invention may be used at each end of a fiber optic trunk cable.

It will also be appreciated that fiber optic lane changers may be provided that reroute different numbers of optical transmission paths of a fiber optic interface on a piece of fiber optic equipment (e.g., fiber optic lane changers that reroute two or three optical transmission paths). For example, FIG. 12J schematically depicts a fiber optic lane changer 800-10 that re-routes optical transmission paths 11 and 12 of fiber optic connector 70 onto the optical fibers that are terminated into positions 7 and 8, respectively, of fiber optic connector 26. It will be appreciated that fiber optic lane changer 800-10 is provided as an example, and that numerous other fiber optic lane changers may be provided that reroute different combinations of the optical transmission paths and/or that reroute such optical transmission paths to different combinations of the optical fibers that are terminated into fiber optic connector 26.

While the fiber optic lane changers 800-1 through 800-10 are each illustrated as having a total of eight lane changer transmission paths, it will be appreciated that in other embodiments they may include more than eight lane changer transmission paths. One potential advantage of such a design is that it may allow two or more fiber optic lane changers to be concatenated to repair a fiber optic trunk cable that has one (or more) of the optical fibers that are terminated into positions 1-4 of a fiber optic connector on a fiber optic trunk cable and one (or more) of the optical fibers that are terminated into positions 9-12 of a fiber optic connector on a fiber optic trunk cable. This is shown schematically in FIG. 12K where fiber optic lane changers 800-11 and 800-12 are concatenated to re-route optical signals to avoid using the optical fibers that terminate into positions 2 and 9 of the fiber optic connector 26.

Pursuant to further embodiments of the present invention fiber optic cables may be provided that include a plurality of active optical fibers and one or more spare optical fibers. Associated fiber optic lane changers are also provided that can be used to re-route signals that are intended for transmission over one or more of the active optical fibers onto one or more of the spare optical fibers, and which can also be used to re-route such signals back to their original positions at the far end of the fiber optic cable. These fiber optic lane changers allow continued use of fiber optic cables even if one or more of the active optical fibers are damaged.

Figure 13A:
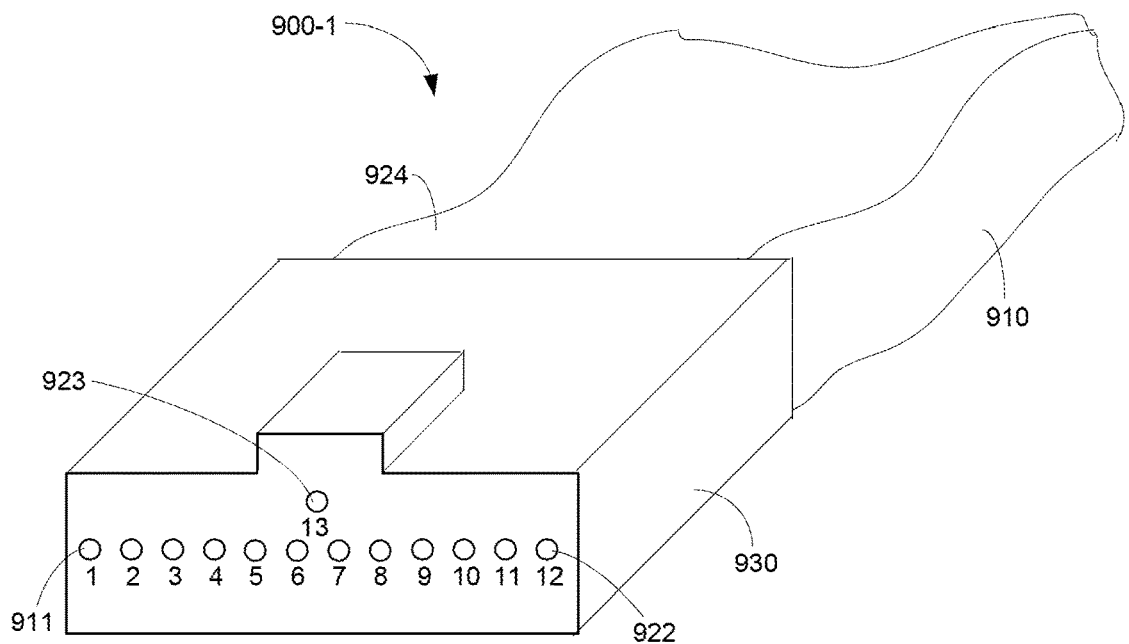
FIGS. 13A and 13B are schematic front views of MPO connectors of MPO connectorized fiber optic cables according to embodiments of the present invention that include one or more spare optical fibers.
Figure 13B:
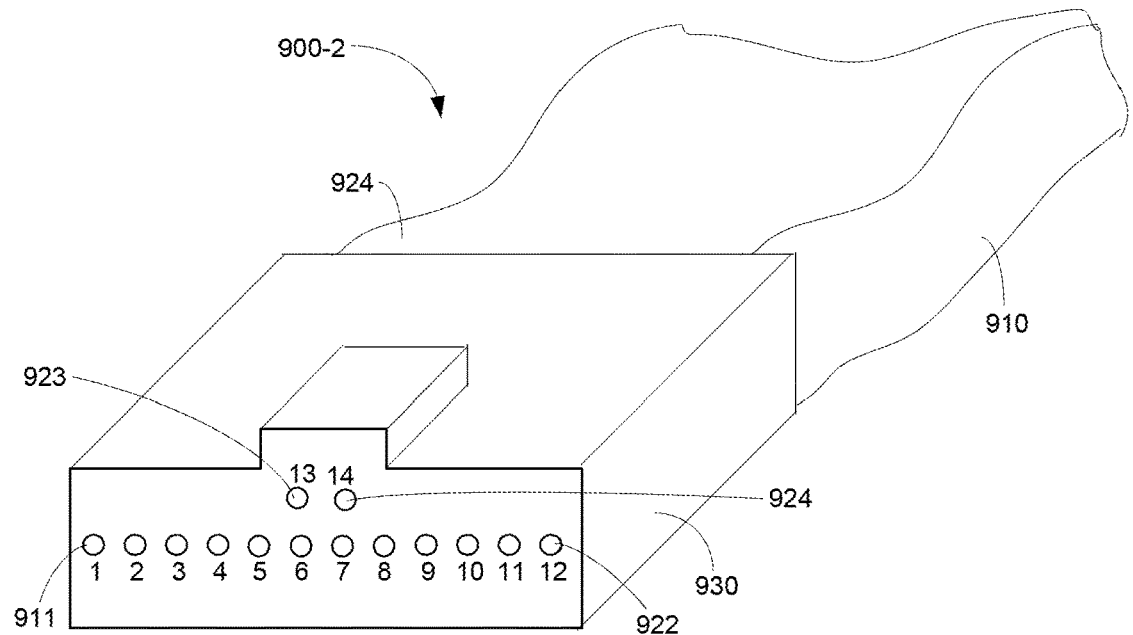

For example, FIGS. 13A and 13B are schematic front views of respective first ends of two MPO connectorized fiber optic cables according to embodiments of the present invention that include one or more spare optical fibers. In particular, FIG. 13A illustrates an end portion of a connectorized fiber optic cable 900-1. As shown in FIG. 13A, the connectorized fiber optic cable 900-1 has a cable segment 910 and an MPO-style connector 930 terminated onto one first end of the cable segment 910. The cable segment 910 includes thirteen optical fibers 911-923 which are enclosed in a jacket 924. First ends of the optical fibers are terminated into MPO-style connector 930, with the first ends of optical fibers 911-922 being terminated into positions 1-12, respectively, of a standardized MPO interface. Optical fiber 923 is terminated into a different position 13, which is shown in the embodiment of FIG. 13A as being above the row formed by positions 1-12. It will be appreciated, however, that position 13 may be located elsewhere. Optical fiber 923 comprises a spare optical fiber that may be used if one of the active optical fibers 911-922 is damaged. FIG. 13B illustrates an end portion of a connectorized fiber optic cable 900-2 that is very similar to connectorized fiber optic cable 900-1, with the one difference being that connectorized fiber optic cable 900-2 includes one additional optical fiber 924 so that it has two spare optical fibers.

Figure 14A:
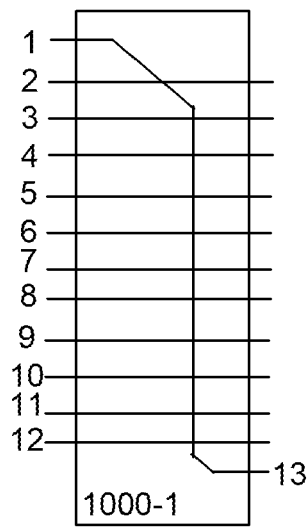
FIGS. 14A and 14B are schematic diagrams illustrating lane changing schemes for the MPO connectorized fiber optic cables of FIGS. 13A and 13B, respectively.
Figure 14B:
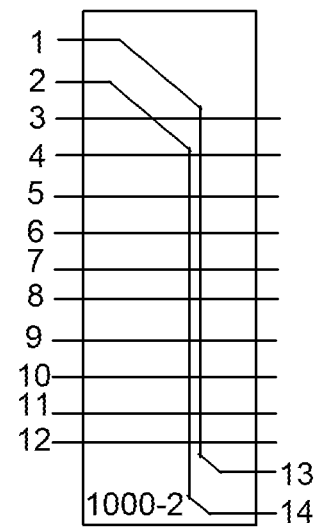

FIGS. 14A and 14B are schematic diagrams illustrating lane changing schemes for the MPO connectorized fiber optic cables 900-1, 900-2 of FIGS. 13A and 13B, respectively. In particular, as shown in FIG. 14A, a fiber optic lane changer 1000-1 may be used with MPO connectorized fiber optic cable 900-1. The fiber optic lane changer 1000-1 reroutes an optical signal input onto lane changer transmission path 1 so that it will be output onto the spare optical fiber 923 of the MPO connectorized fiber optic cables 900-1 (since optical fiber 923 terminates into position 13 of the MPO connector 930). Eleven additional fiber optic lane changers (not shown) may be provided that similarly reroute the respective optical signals that are input onto lane changer transmission paths 1-12 so that they will be output onto the spare optical fiber 923 of MPO connectorized fiber optic cable 900-1. If the fiber optic lane changer 1000-1 is unkeyed, then only five additional fiber optic lane changers may be required. As shown in FIG. 14B, a fiber optic lane changer 1000-2 may be used with the MPO connectorized fiber optic cable 900-2. The fiber optic lane changer 1000-2 reroutes optical signals that are input onto lane changer transmission paths 1 and 2 so that they will be output onto the respective spare optical fibers 923 and 924 of MPO connectorized fiber optic cables 900-2. Five additional fiber optic lane changers (not shown) may be provided that similarly reroute the respective optical signals that are input onto lane changer transmission paths 3-4, 5-6, 7-8, 9-10 and 11-12 so that they will be output onto the spare optical fibers 923, 924 of fiber optic cable 900-2. If the fiber optic lane changer 1000-2 is unkeyed, then only two additional fiber optic lane changers may be required.

Notably, the fiber optic lane changers that are discussed above with reference to FIGS. 13A-B and 14A-B may be used with fiber optic cables that are connected to any type of fiber optic equipment, including equipment that transmits and/or receives signals on all of the optical transmission paths of a conventional fiber optic cable.

In some embodiments of the present invention, fiber optic lane changers are provided that are configured to be interposed between a first fiber optic connector that has a plurality of optical fibers and a second fiber optic connector that has a plurality of optical transmission paths. The first fiber optic connector may be, for example, a fiber optic connector of a fiber optic trunk cable and the second fiber optic connector may be, for example, a fiber optic connector on a piece of fiber optic equipment. The first and second fiber optic connectors may be "mating" fiber optic connectors so that they may either be directly mated to each other or mated via a fiber optic adapter such that at least some of the optical fibers of the first fiber optic connector will optically couple with respective ones of the optical transmission paths of the second fiber optic connector. The fiber optic lane changer may include at least a first lane changer transmission path that optically couples a first of the optical fibers of the first fiber optic connector to a first of the optical transmission paths of the second fiber optic connector when the fiber optic lane changer is interposed between the first and second fiber optic connectors. However, if the first and second fiber optic connectors are mated without the fiber optic lane changer interposed therebetween, then the first of the optical fibers will not be optically coupled to the first of the optical transmission paths. Thus, the first lane changer transmission path of the fiber optic lane changer may be used to reroute optical signals carried on the first of the optical transmission paths to a spare optical fiber in the first fiber optic connector.

Figure 15:
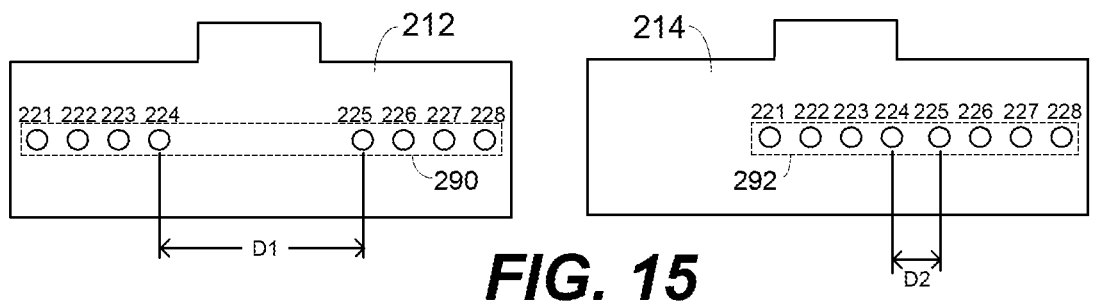
FIG. 15 is a schematic diagram illustrating end views of the fiber optic connectors that are included in the fiber optic lane changer of FIG. 5A.

Pursuant to further embodiments of the present invention, fiber optic lane changers are provided that are suitable for use with a fiber optic trunk cable that has at least first and second optical fibers that have respective first ends that are arranged in respective first and second positions of a first linear array. These fiber optic lane changers include a first lane changer transmission path that has a first end that is positioned to optically couple with the first end of the first optical fiber and a second end that is arranged in a first position of a second linear array. These fiber optic lane changers further include a second lane changer transmission path that has a first end that is positioned to optically couple with the first end of the second optical fiber and a second end that is arranged in the second position of the second linear array. A first distance between the first and second positions of the first linear array is different than a second distance between the first and second positions of the second linear array. FIG. 15 which shows end views of the fiber optic connectors 212 and 214 that are included in fiber optic lane changer 200-1 of FIG. 5A, illustrates an example embodiment of such a fiber optic lane changer. As shown in FIG. 15, the first ends of the optical fibers 221-228 that form the lane changer transmission paths terminate into the first fiber optic connector 212 to define a first linear array 290. The first ends of optical fibers 224 and 225, for example, are at first and second positions in the first linear array that are separated by a distance D1. The second ends of the optical fibers 221-228 terminate into the second fiber optic connector 214 to define a second linear array 292. The second ends of optical fibers 224 and 225, for example, are at first and second positions in the second linear array that are separated by a distance D2. The distances D1 and D2 are different.

Pursuant to still further embodiments of the present invention, fiber optic lane changers are provided that include first and second connectors and a plurality of lane changer transmission paths having first ends that are received within the first connector and second ends that are received within the second connector. The first ends of the lane changer transmission paths are arranged in respective ones of a first subset of a plurality of optical interface positions in a standardized connector configuration (e.g., in certain ones of the twelve positions defined for an MPO compliant fiber optic connector) and the second ends of the lane changer transmission paths are arranged in respective ones of a second subset of the plurality of optical interface positions in the standardized connector configuration. The first and second ends of a first of the lane changer transmission paths are in optical interface positions in the standardized connector configuration that are in mirror image positions, and the first and second ends of a second of the optical transmission paths are in optical interface positions in the standardized connector configuration that are not in mirror image positions.

Pursuant to still further embodiments of the present invention, fiber optic lane changers are provided that include a plurality of lane changer transmission paths that have first ends that are aligned to optically couple with respective ones of the eight outermost optical transmission paths of a first mating fiber optic connector. At least one of the lane changer transmission paths has a second end that is aligned to optically couple with one of the four innermost optical transmission paths of a second mating fiber optic connector.

The fiber optic lane changers according to embodiments of the present invention may provide a number of advantages. For example, fiber optic trunk cables may be, for example, between about 3-100 meters in length, and may be very expensive due to the lengths of the optical fibers. The optical fibers of these fiber optic trunk cables may be damaged during installation. Typically, the damage during installation involves cracking or breaking one or more of the optical fibers in the fiber optic trunk cable. End portions of the optical fibers in a fiber optic trunk cable may also be damaged when the fiber optic connectors on either end thereof are connected or disconnected to mating fiber optic connectors. If end portions of the optical fibers are damaged, the fiber optic trunk cable may be re-terminated with a new, fully polished fiber optic connector that replaces the fiber optic connector with the damaged optical fiber(s) or replaced with a fusion or mechanical splice. Such solutions, however, require active, bulky equipment and, in practice, are typically impractical in the field. If a central portion of an optical fiber is damaged, the fiber optic trunk cable is typically rendered useless and must be replaced. The cost of a replacement fiber optic trunk cable may be quite high, as may the cost of reinstalling fiber optic trunk cables which are often routed through walls, floors and or ceilings and which may be bundled together with other cables.

The fiber optic lane changers according to embodiments of the present invention may be orders of magnitude cheaper to manufacture than a typical fiber optic trunk cable, and may be used to make an otherwise unusable fiber optic trunk cable usable for some applications. The fiber optic lane changers according to embodiments of the present invention may also be extremely simple to install. The fiber optic lane changers will add at least two additional connections to the fiber optic channels supported by the fiber optic trunk cable (as a lane changer is installed on either side of the fiber optic trunk cable). Typically each connection will have a loss of less than 0.25 dB. The fiber optic channel will need to have sufficient margin to handle this additional connection loss.

While embodiments of the present invention have been primarily discussed above with respect to MPO connectorized fiber optic trunk cables, it will be appreciated that the invention is not limited to such fiber optic trunk cables. For example, a wide variety of fiber optic trunk cables are deployed that include more than twelve optical fibers. These fiber optic trunk cables can have connectors that include the same number of optical fibers as the cable or, alternatively, may break out into pigtails that have connectors with fewer number of optical fibers. As one example, fiber optic trunk cables that include 96 optical fibers are available that break out into pigtails that include twelve optical fibers on at least one end thereof. Each pigtail may be terminated, for example, with an MPO connector. It will be appreciated that embodiments of the present invention extend to such fiber optic trunk cables and to any other fiber optic trunk cables that include spare optical fibers.

While the present invention has been described above primarily with reference to the accompanying drawings, it will be appreciated that the invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A fiber optic lane changer that is configured to be interposed between a first fiber optic connector including a first multi-fiber ferrule, the first fiber optic connector having a plurality of optical fibers and a second fiber optic connector including a second multi-fiber ferrule, the second fiber optic connector having a plurality of optical transmission paths, wherein the plurality of optical fibers are positioned to optically couple with corresponding ones of the plurality of optical transmission paths when the first fiber optic connector is mated with the second fiber optic connector, the fiber optic lane changer providing a lane change between the first multi-fiber ferrule of the first fiber optic connector and the second multi-fiber ferrule of the second fiber optic connector, the fiber optic lane changer comprising:
   a first lane changer transmission path that optically couples a first of the plurality of optical fibers to a first of the plurality of optical transmission paths when the fiber optic lane changer is interposed between the first fiber optic connector and the second fiber optic connector, wherein the first of the plurality of optical fibers is inoperable and bypassed such that the first of the plurality of optical fibers is not optically coupled to the first of the plurality of optical transmission paths when the first fiber optic connector is mated with the second fiber optic connector.

2. The fiber optic lane changer of claim 1, further comprising a second lane changer transmission path that optically couples a second of the plurality of optical fibers to a second of the plurality of optical transmission paths when the fiber optic lane changer is interposed between the first fiber optic connector and the second fiber optic connector, wherein the second of the plurality of optical fibers is optically coupled to the second of the plurality of optical transmission paths when the first fiber optic connector is mated with the second fiber optic connector.

3. The fiber optic lane changer of claim 1, in combination with a fiber optic trunk cable that includes the first fiber optic connector, wherein one of the plurality of optical fibers is inoperable due to physical damage.

4. The fiber optic lane changer of claim 1, wherein the fiber optic lane changer comprises a fiber optic patch cord.

5. The fiber optic lane changer of claim 1, wherein the fiber optic lane changer comprises an inline connector block.

6. The fiber optic lane changer of claim 1, wherein the number of optical fibers in the first fiber optic connector exceeds the number of optical transmission paths in the second fiber optic connector.

7. The fiber optic lane changer of claim 1, wherein the first lane changer transmission path is one of a plurality of lane changer transmission paths that are included in the fiber optic lane changer, and wherein the number of optical fibers in the first fiber optic connector exceeds the number of fiber optic lane changer transmission paths that are included in the fiber optic lane changer.

8. The fiber optic lane changer of claim 1, wherein the first of the plurality of optical fibers is not optically coupled to any of the plurality of optical transmission paths when the first fiber optic connector is mated with the second fiber optic connector.

9. The fiber optic lane changer of claim 1, wherein the first fiber optic connector is a Multi-fiber Push On connector and the second fiber optic connector is a connector of a Quad Small Form-Factor Pluggable optical transceiver module.

10. A fiber optic lane changer for use with a fiber optic trunk cable having a first optical fiber and a second optical fiber that have respective first ends that are arranged in respective first and second positions of a first linear array, the fiber optic lane changer comprising:
   a first lane changer transmission path that has a first end that is positioned to optically couple with the first end of the first optical fiber and a second end that is arranged in a first position of a second linear array; and
   a second lane changer transmission path that has a first end that is positioned to optically couple with the first end of the second optical fiber and a second end that is arranged in a second position of the second linear array;
   wherein a first distance between the first and second positions of the first linear array is different than a second distance between the first and second positions of the second linear array; and
   wherein when the fiber optic lane changer is interposed between a first multi-fiber optic connector and a second multi-fiber optic connector, the fiber optic lane changer provides a lane change between the first multi-fiber optic connector and the second multi-fiber optic connector.

11. The fiber optic lane changer of claim 10, wherein the trunk cable further includes third through eighth optical fibers that have respective first ends that are arranged in respective third through eighth positions of the first linear array and the fiber optic lane changer further includes third through eighth lane changer transmission paths that have respective first ends that are arranged in respective third through eighth positions of the second linear array, wherein adjacent ones of the first through eighth positions of the first linear array are spaced apart from each other by a third distance and the first through eighth positions of the second linear array are divided into a first group of four positions in which adjacent positions are spaced apart from each other by the third distance and a second group of four positions in which adjacent positions are spaced apart from each other by the third distance, the first and second groups being spaced apart from each other by a fourth distance that exceeds the third distance.

12. The fiber optic lane changer of claim 11, wherein the fourth distance is about four times the third distance.

13. The fiber optic lane changer of claim 11, wherein the first, third, fourth and fifth lane changer transmission paths comprise linear optical transmission paths and the second, sixth, seventh and eighth lane changer transmission paths comprise non-linear lane changer transmission paths.

14. The fiber optic lane changer of claim 10, wherein the trunk cable further includes a third optical fiber that is not optically coupled to any lane changer transmission path of the fiber optic lane changer when the fiber optic lane changer is mated with a connector of the fiber optic trunk cable.

15. The fiber optic lane changer of claim 14, wherein the third optical fiber is inoperable due to physical damage.

16. A fiber optic lane changer, comprising:
a first multi-fiber connector;
a second multi-fiber connector; and
a plurality of lane changer transmission paths having first ends that are received within the first multi-fiber connector and second ends that are received within the second multi-fiber connector when the fiber optic lane changer is positioned between the first multi-fiber connector and the second multi-fiber connector,
wherein the first ends of the lane changer transmission paths are arranged in respective ones of a first subset of a plurality of optical interface positions in a standardized connector configuration and the second ends of the lane changer transmission paths are arranged in respective ones of a second subset of the plurality of optical interface positions in the standardized connector configuration, and
wherein the first and second ends of a first of the lane changer transmission paths are in optical interface positions in the standardized connector configuration that are in mirror image positions, and the first and second ends of a second of the optical transmission paths are in optical interface positions in the standardized connector configuration that are not in mirror image positions.

17. The fiber optic lane changer of claim 16, wherein the first and second multi-fiber connectors are configured to mate with the same type of external connector.

18. The fiber optic lane changer of claim 17, wherein the standardized connector configuration comprises a Multi-fiber Push On fiber optic connector configuration having twelve optical interface positions that are aligned in a single row.

19. The fiber optic lane changer of claim 16, wherein the first and second ends of at least four of the optical transmission paths are in mirror image optical interface positions in the standardized connector configuration.

20. The fiber optic lane changer of claim 19, wherein the first and second ends of four other of the optical transmission paths are not in mirror image optical interface positions in the standardized connector configuration.

21. The fiber optic lane changer of claim 16, wherein the plurality of lane changer transmission paths comprise a plurality of optical fibers.

22. The fiber optic lane changer of claim 21, wherein a first subset of the optical fibers each extend linearly through the fiber optic lane changer, and a second subset of the optical fibers each have at least one bend.

23. A fiber optic lane changer, comprising:
a plurality of lane changer transmission paths that have first ends that are aligned to optically couple with respective ones of the eight outermost optical transmission paths of a first mating multi-fiber optic connector, at least one of the lane changer transmission paths having a second end that is aligned to optically couple with one of the four innermost optical transmission paths of a second mating multi-fiber optic connector.

24. The fiber optic lane changer of claim 23, wherein the second mating fiber optic connector comprises a Multi-fiber Push On fiber optic connector.

25. The fiber optic lane changer of claim 24, wherein the first mating fiber optic connector comprises a fiber optic connector of a Quad Small Form-Factor Pluggable ("QSFP") optical transceiver module.

26. The fiber optic lane changer of claim 23, wherein the first end of a first of the lane changer transmission paths ends is aligned to optically couple with an outermost optical transmission path of the first mating fiber optic connector, and the second end of the first of the lane changer transmission paths ends is aligned to optically couple with an outermost optical transmission path of the second mating fiber optic connector.

27. The fiber optic lane changer of claim 26, wherein the first of the lane changer transmission paths extends linearly through the fiber optic lane changer.

28. The fiber optic lane changer of claim 23, wherein the number of optical transmission paths included in the second mating fiber optic connector exceeds the number of lane changer transmission paths included in the fiber optic lane changer.

* * * * *